US011349906B1

(12) United States Patent
Paduroiu et al.

(10) Patent No.: US 11,349,906 B1
(45) Date of Patent: May 31, 2022

(54) MULTIPART UPLOAD FOR LARGE DATA EVENTS IN STREAMING DATA STORAGE

(71) Applicant: EMC IP Holding Company LLC, Hopkinton, MA (US)

(72) Inventors: Andrei Paduroiu, Bellevue, WA (US); Mikhail Danilov, Saint Petersburg (RU)

(73) Assignee: EMC IP Holding Company LLC, Hopkinton, MA (US)

(*) Notice: Subject to any disclaimer, the term of this patent is extended or adjusted under 35 U.S.C. 154(b) by 0 days.

(21) Appl. No.: 17/205,133

(22) Filed: Mar. 18, 2021

(51) Int. Cl.
*G06F 15/16* (2006.01)
*H04L 67/06* (2022.01)
*H04L 67/143* (2022.01)
*H04L 67/1074* (2022.01)
*H04L 67/1097* (2022.01)

(52) U.S. Cl.
CPC .......... *H04L 67/06* (2013.01); *H04L 67/1085* (2013.01); *H04L 67/1097* (2013.01); *H04L 67/143* (2013.01)

(58) Field of Classification Search
CPC .... H04L 67/06; H04L 67/143; H04L 67/1097
See application file for complete search history.

(56) References Cited

U.S. PATENT DOCUMENTS

| 2008/0162662 | A1* | 7/2008 | Fujita | G06F 11/1464 706/46 |
| 2018/0232282 | A1* | 8/2018 | Danilov | G06F 3/0689 |
| 2019/0320022 | A1* | 10/2019 | Raghunath | H04L 67/1097 |

* cited by examiner

*Primary Examiner* — Yves Dalencourt
(74) *Attorney, Agent, or Firm* — Amin, Turocy & Watson, LLP

(57) ABSTRACT

A streaming data storage system facilitates appending of large events (e.g., up to one gigabyte) to a data segment of a streaming data storage system in a multipart upload operation. A micro-transaction data structure is created for a multipart upload of a large event, to which subparts of the multipart upload are appended during write operations. Order of the subparts is preserved, including when not appended in order, to provide for reading of the subparts in order. An event reference to the micro-transaction data structure is maintained in a data segment corresponding to the large event, and when the event reference encountered during reading, results in reading from the micro-transaction data structure when the multipart upload is complete. The reading from the micro-transaction data structure maintains the order of the large event's subparts, such that raw data is returned to an upstream reader application as the large event.

20 Claims, 14 Drawing Sheets

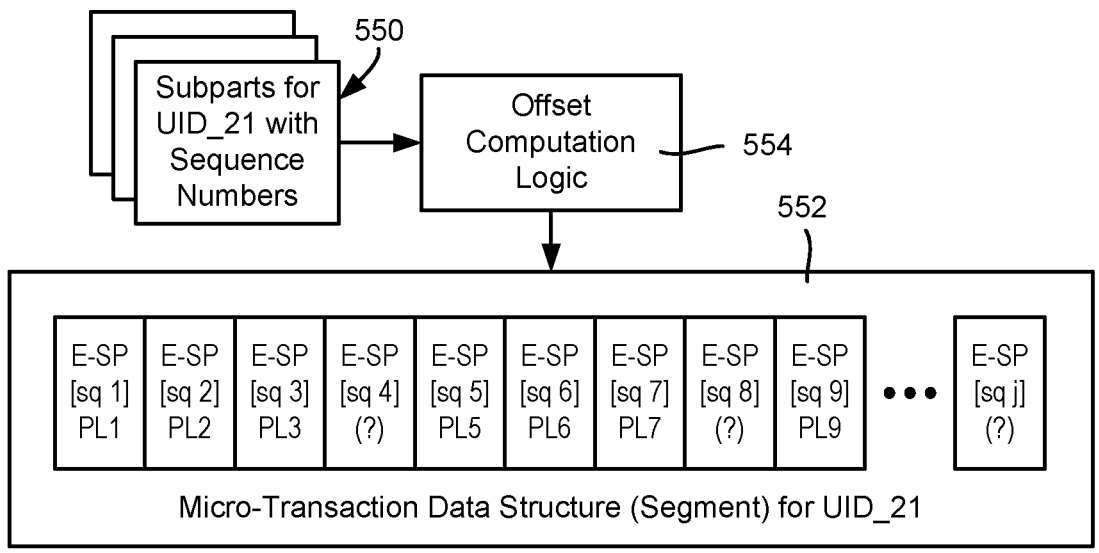
FIG. 5A
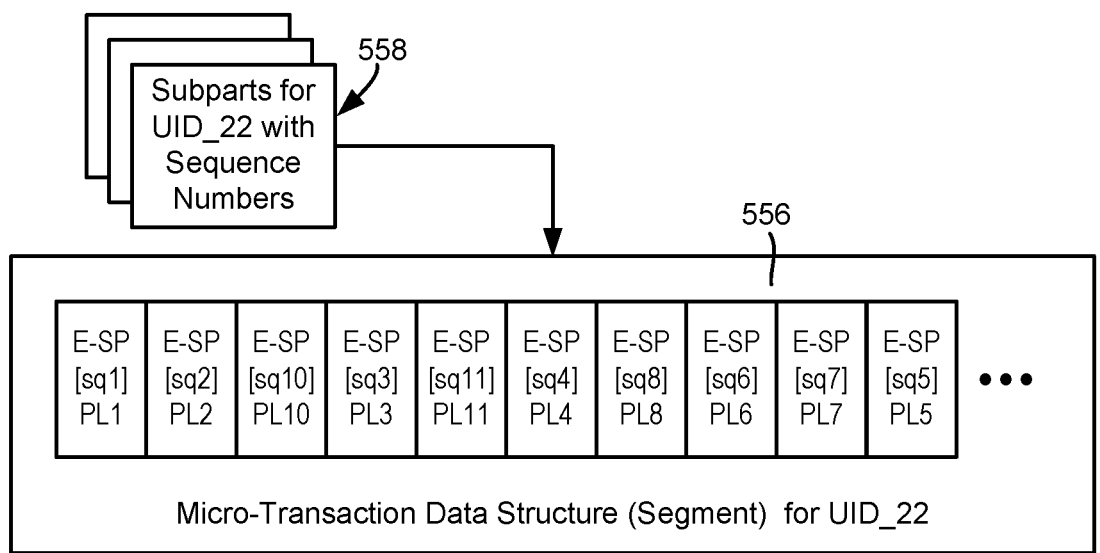
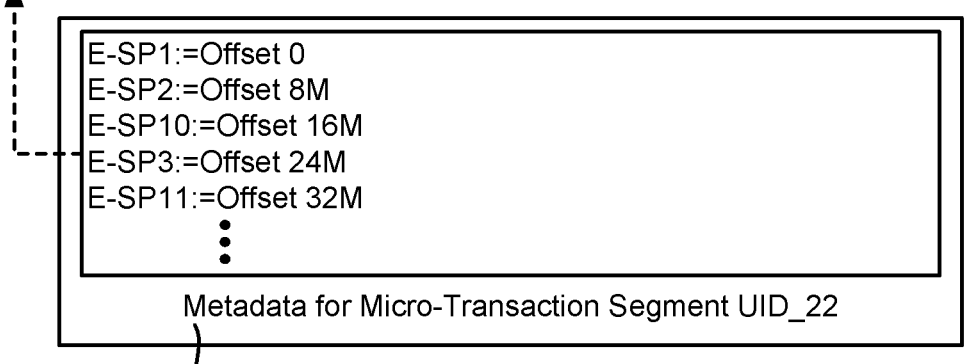
FIG. 5B

_US 11,349,906 B1_

MULTIPART UPLOAD FOR LARGE DATA EVENTS IN STREAMING DATA STORAGE

BACKGROUND

Some contemporary data storage systems store data in a storage abstraction referred to as a data stream, or more simply, a stream. A stream is identified with a name, and can store continuous and potentially unbounded data; more particularly, a stream comprises a durable, elastic, append-only, sequence of stored events. New events are added to a tail (front) of a stream. As can be readily appreciated, one appropriate use case for a streaming data storage system is where devices/sensors may generate thousands of events (data points) per second to be stored for subsequent processing.

To support such a high rate of event ingestion, there is a limit on the size of events. While this limit is adequate for many streaming use case scenarios, there are other use cases that will not work with a streaming data storage system because they need to store larger events that would exceed the event size limitation.

BRIEF DESCRIPTION OF THE DRAWINGS

The technology described herein is illustrated by way of example and not limited in the accompanying figures in which like reference numerals indicate similar elements and in which:

FIGS. 5A and 5B are block diagram representations of example alternatives for storing subparts of a large event, in accordance with various aspects and implementations of the subject disclosure.

DETAILED DESCRIPTION

Various aspects of the technology described herein are generally directed towards supporting the use of large sized data events in a data streaming storage system. As will be understood, the technology facilitates the uploading of a large event in a way that is low overhead with respect to resource usage.

It should be understood that any of the examples herein are non-limiting. Virtually any stream-based data storage system may benefit from the technology described herein. Thus, any of the embodiments, aspects, concepts, structures, functionalities or examples described herein are non-limiting, and the technology may be used in various ways that provide benefits and advantages in computing and data storage in general.

Reference throughout this specification to "one embodiment," "an embodiment," "one implementation," "an implementation," etc. means that a particular feature, structure, or characteristic described in connection with the embodiment/implementation can be included in at least one embodiment/implementation. Thus, the appearances of such a phrase "in one embodiment," "in an implementation," etc. in various places throughout this specification are not necessarily all referring to the same embodiment/implementation. Furthermore, the particular features, structures, or characteristics may be combined in any suitable manner in one or more embodiments/implementations.

Aspects of the subject disclosure will now be described more fully hereinafter with reference to the accompanying drawings in which example components, graphs and/or operations are shown. In the following description, for purposes of explanation, numerous specific details are set forth in order to provide a thorough understanding of the various embodiments. However, the subject disclosure may be embodied in many different forms and should not be construed as limited to the examples set forth herein.

Figure 1:
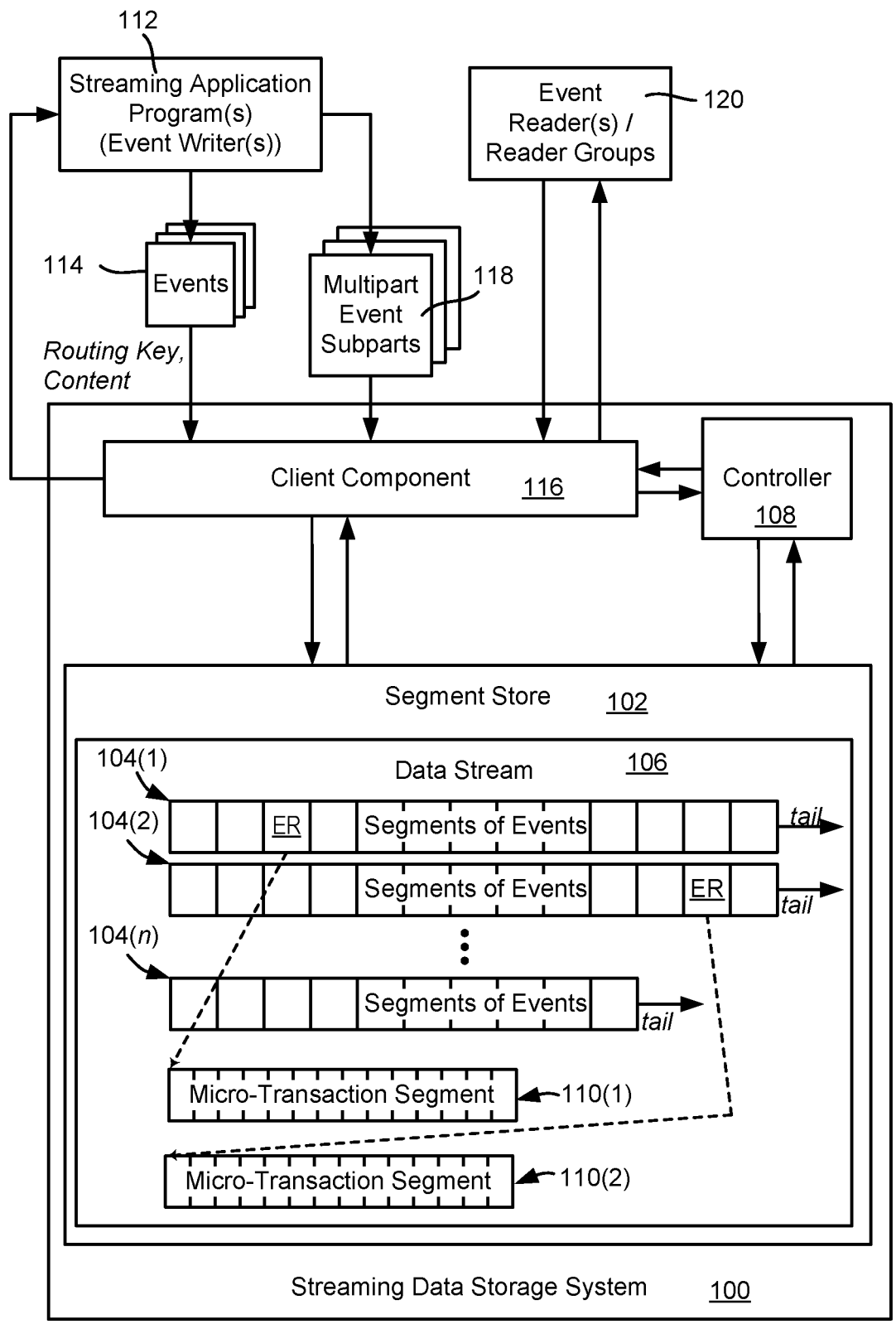
FIG. 1 is a block diagram representation of example components and data-related operations in a streaming data storage system in which large events can be appended to a data segment, in accordance with various aspects and implementations of the subject disclosure.

FIG. 1 shows a streaming data storage system 100 that includes a segment store 102 that maintains segments of streamed data events 104(1)-104(*n*) of a data stream 106; (note that in one implementation, the segment store is a stream-agnostic component, with a controller 108 responsible for uniting individual segments into the data stream). As described herein, the segments can contain event references to associated micro-transaction segments 110(1) and 110(2) that contain the data of large events. Not every segment needs to have an event reference to an associated micro-transaction segment, and a single segment can contain multiple event references to respective associated micro-transaction segments.

In general, one or more streaming application programs 112, referred to as event writer(s) or writer applications, provide events 114 into the streaming data storage system 100 via an application programming interface (API) of a client component 116. As is known, a conventional event comprises a routing key along with the event data contents to be stored; the contents are alternatively referred to herein as the payload. The routing key for each event is hashed to determine to which segment that event is appended.

As described herein, large events are received by the client component 116 (e.g., via a different API) as multipart event subparts 118. A large event has the same routing key for each of the subparts, and thus is associated with one of the segments. These subparts are maintained in an appropriate one of the micro-transaction segments.

Event reader(s) or reader group(s) 120 read the events for processing via a call to a read API of the client component 116. As described herein, the technology operates to return both conventional events and large events to the requesting reader.

Figure 2:
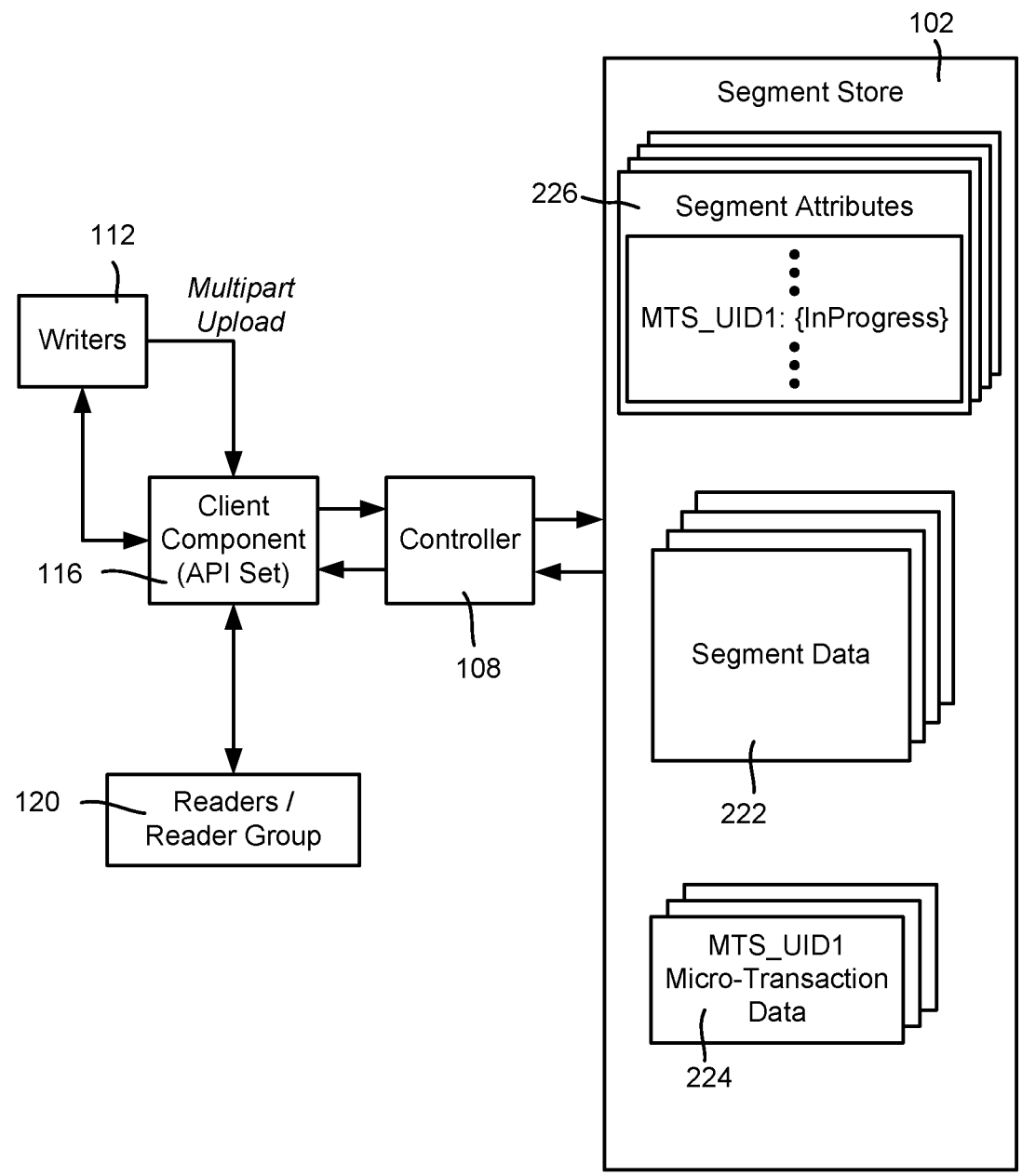
FIG. 2 is a representation of example components and related data structures in a streaming data storage system in which large events can be handled, in accordance with various aspects and implementations of the subject disclosure.

FIG. 2 shows one example implementation of a streaming data storage system that comprises the client component 116 (FIG. 1) that provides the APIs to the streaming data storage system. As in FIG. 1, the client component 116 is coupled to the controller 108, which in general is a system coordinator.

The segment store 102 manages the segments of a data stream, and thus maintains segment data 222 and micro-transaction data 224. As described herein, the segment store also maintains per segment metadata, shown in FIG. 2 as segment attributes 226, which can include information related to a multipart upload.

As set forth above, to support a high ingestion rate of events, events are limited to relatively small events, which in one current implementation limits each event size to eight megabytes. While this is adequate for the many streaming use cases, there are also use cases that need events of a greater size. For example, high-definition video streaming devices may need more than eight megabytes per atomic write, because, for example, an uncompressed 4K frame has just under 8.3M pixels, each of which takes more than 4 bytes; a video compressor may end up writing multiple frames at once, with the total write size easily exceeding 100 MB. Other use-cases exist as well.

Having the application writer program handle large events on its own by splitting them into subevents leads to problems, in part because the logic would be implemented at the application level. If such a large event write is abandoned, there is no way for the data streaming storage system to know what to do with the already written subevents. Another issue is without data streaming storage system control, stream truncation may delete a part of the subevents such a large event. Further, the continuity of appends of subevents of one large event cannot be guaranteed without additional limitations.

An alternate implementation involves the use of transactions. For each such large append, the system can open a transaction, split the "large event" into smaller ones and write them to the transaction using the same routing key (so they end up on the same segment), then commit the transaction. This resolves the "continuity" problem, but is subject to the high overhead of streaming data storage system transactions. For example, a 2 h video @ 30 fps has 216,000 frames; uploading each frame (or even all frames in each second) in a streaming data storage system transaction is a significant waste of computing resources, and can overwhelm the controller. Indeed, due to their distributed nature, transactions have significantly high overhead, needing intensive coordination between the controller and the segment stores, along with complex synchronization between the components. Rolling transactions, in which a stream can scale-up or scale-down its segments despite active transactions, are even more resource-consuming.

Described herein is data streaming storage system support for large events, e.g., events larger than the eight megabyte limitation of one implementation. The technology support events of up to (at least) 1024 MB (1 GB) in size; (as will be understood, the technology can be used for even larger events, but in practice, such use cases are currently not common).

To this end, large events are uploaded using a multipart upload approach implemented via modified and more optimal streaming data storage system transactions.

The default streaming data storage system pattern assumes events to be objects that can be easily serialized for storage and de-serialized when read back. A large event can be any sequence of bytes. Such a large event, when written, can be easily divided into multiple smaller parts. When read back, such a large event can be wrapped in an input stream.

A streaming data storage system multipart upload API allows applications/writers to write large objects in multiple subparts. In one implementation, the application initiates a multipart upload, uploads the event parts, and after the application has uploaded the parts, completes the multipart upload via a request. Upon receiving the multipart upload complete request, the streaming data storage system constructs the large event from the uploaded parts, whereby other applications/readers can then access the event as if the large event has been written in a single upload.

Note that additional information can be made accessible with respect to a multipart upload. For example, an extended multipart upload API call can list the inprogress multipart uploads, another API call can list the parts that the application has uploaded for a specific multipart upload, and so on.

When the application requests to initiate a multipart upload, the streaming data storage system creates a micro-transaction (which is not the same as a traditional streaming data storage system transaction). The application also provides the routing key for the multipart upload so that streaming data storage system can find the destination stream segment for the large event. The streaming data storage system associates a system-unique ID with the micro-transaction.

Each event subpart needs to conform to the size (e.g., eight megabyte) limitation. Further, when uploading a subpart, the application specifies a part number; for example, for a 1 GB upload, the subpart number is between 1 and 128 (1 GB/8 MB). A subpart sequence number uniquely identifies a subpart and its relative position in the event being uploaded. Subpart are stored to the micro-transaction associated with the multipart upload. If the application uploads a new subpart using the same subpart number as a previously uploaded subpart, the previously uploaded subpart is overwritten (actually or logically).

When the application completes the multipart upload, the streaming data storage system commits the micro-transaction. The large event, which can be a straightforward concatenation of its parts, gets logically appended to its stream segment.

Thus, large events are created using the multipart upload technology. Each multipart upload is built using a micro-transaction. A micro-transaction is similar to a normal streaming data storage system transaction; however, the use of micro-transactions eliminates the complex and heavyweight part of normal streaming data storage system transactions that rely on the controller.

Each large event lands to exactly one stream segment, the segment unambiguously defined by the routing key of the large event (multipart upload). Such a transaction normally does not require coordination/synchronization between the controller and the segment store for that segment. Therefore, a micro-transaction can be implemented at the segment store level, as a micro-transaction has as little as one segment, which is a counterpart of the stream segment, to accommodate the large event. Upon a request from the client, the segment store can merge its micro-transaction segment into the stream segment without any interactions with the controller.

In order to make sure that large events do not occupy too many system resources, the streaming data storage system may limit the number of active micro-transactions per segment store instance (e.g., ten). Further, the streaming data storage system may implement automatic aborting (expiring) of multipart uploads to micro-transactions that have been idle for too long of a time (e.g., five minutes).

It should be noted that some events can be greater than 8 megabytes, but not be considered a large event. For example, a 12 megabyte event exceeds the 8 megabyte limitation, but can be handled transparently by the streaming data storage system (e.g., the client component) without the writer application performing a multipart upload. Such "slightly oversized" events are those that are greater than 8 megabytes, but below a predefined (e.g., user defined) threshold size, e.g., 100 megabytes. For such slightly oversized events, the client component can perform the multipart upload operations without involving the writer application; e.g., the client component library can cause creation of a micro-transaction, break the slightly oversized event into subparts, and complete the multipart upload. Writer applications thus can work with such slightly oversized events as if they were normal events; e.g., applications may still rely on serialization/deserialization. Note that the limit on the maximal number of active multipart uploads and the threshold size for extra-large events are related, as the greater the limit, the smaller the threshold size needs to be, and vice-versa.

Note that data streams can have their data segments automatically scaled, which can impact a multi-part upload of a slightly oversized event (e.g., a 12 megabyte event). Namely, it is theoretically possible that the stream segment to which the slightly oversized event is being appended to has been sealed due to sealing during the multipart upload. When the segment store detects such a condition, the segment store can request the controller to promote the micro-transaction to a normal transaction, and thereby use the existing rolling transaction mechanism to append the data.

Figure 3:
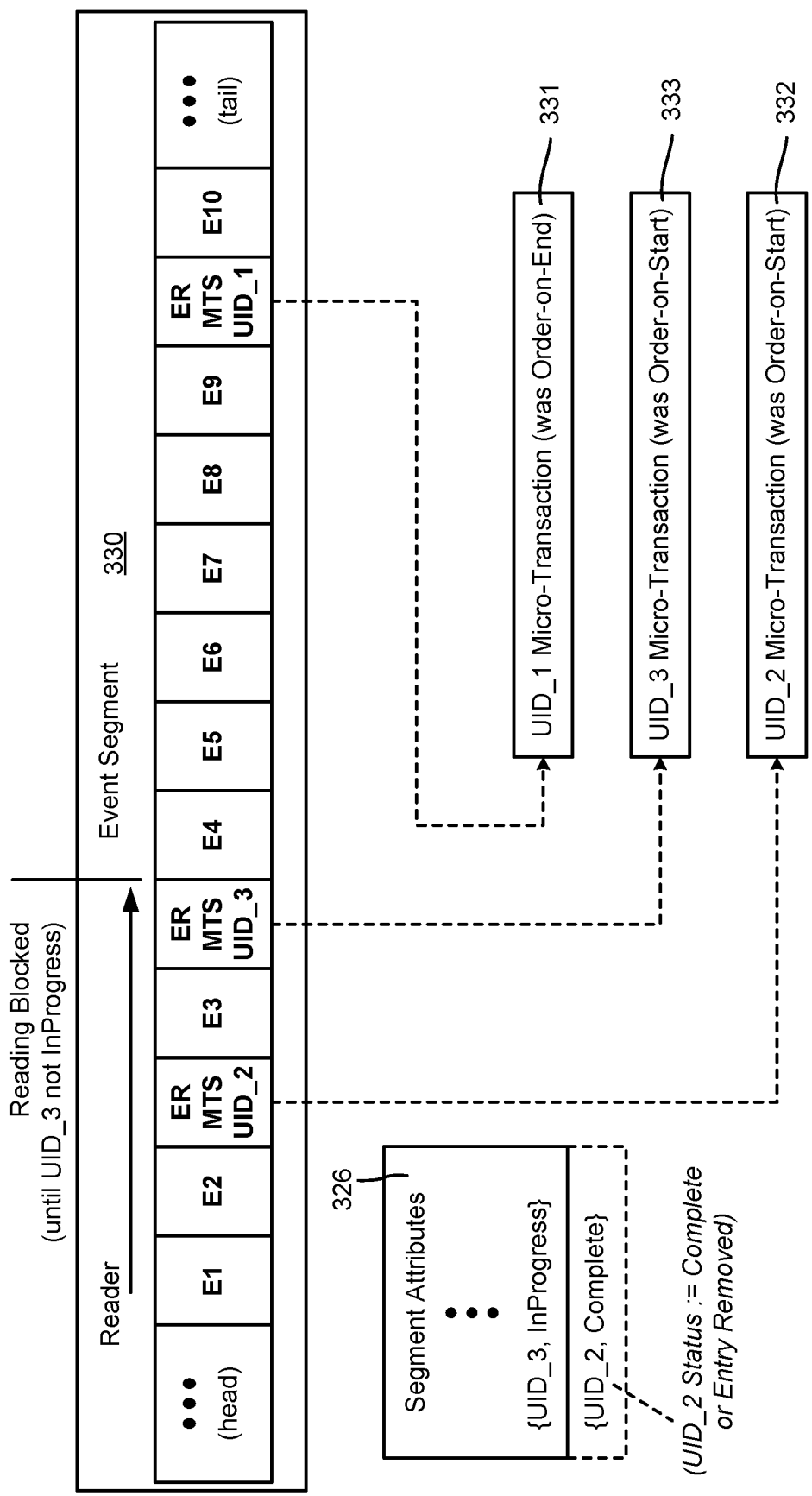
FIG. 3 is an example representation of a data segment containing event references to micro-transaction segments that contain large event subparts, in accordance with various aspects and implementations of the subject disclosure.
Figure 4:
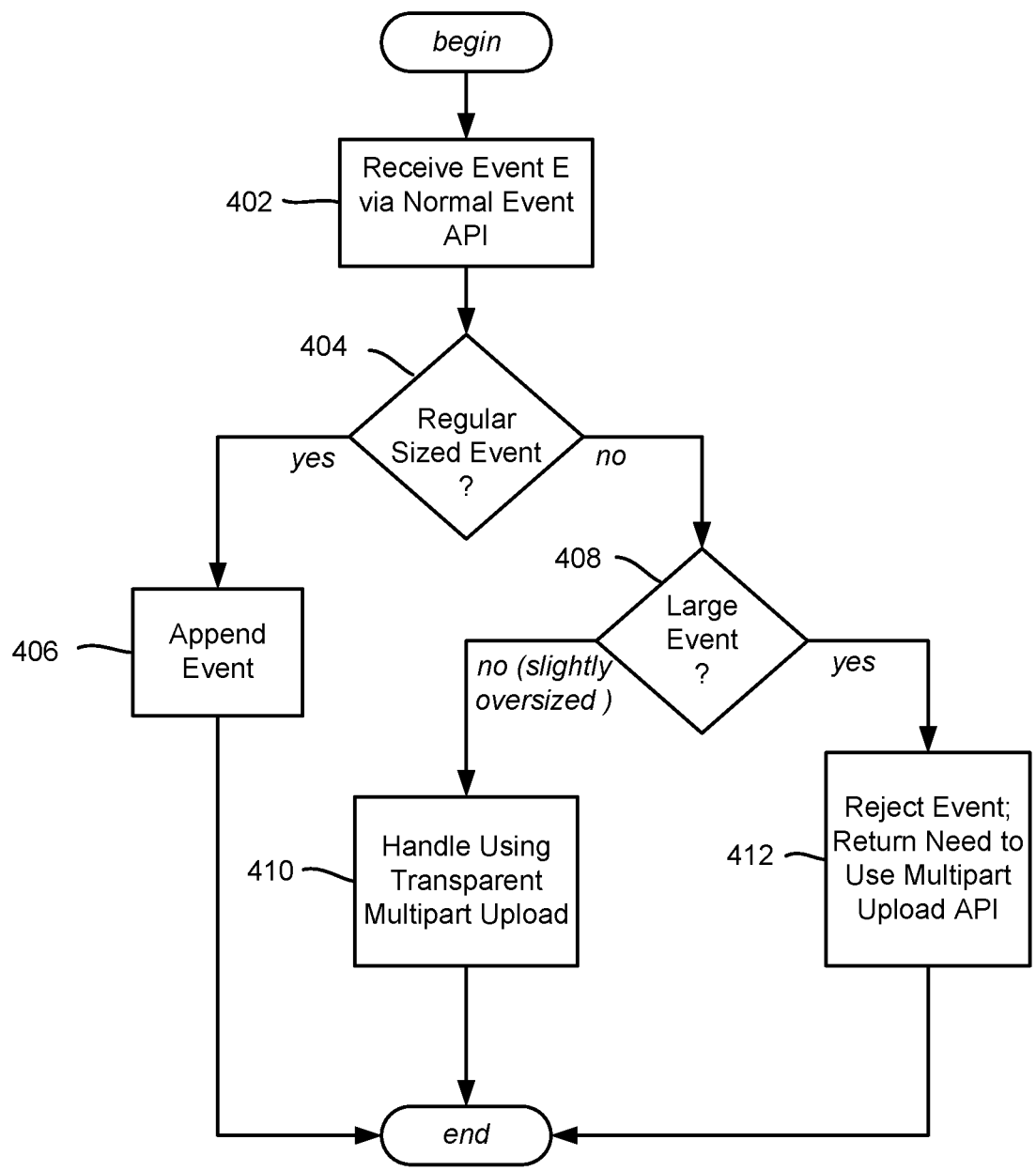
FIG. 4 is a flow diagram representing example operations of handling a received event, in accordance with various aspects and implementations of the subject disclosure.

Turning to examples of implementing multipart uploads and the interactions between the client and segment store or segment stores, FIG. 3 shows an event segment 330 containing event references to micro-transactions. Each event reference (ER) contains the identifier of the micro-transaction, (exemplified in FIG. 3 as "MTS UID2", "MTS UID3" and "MTS UID1").

Note that the order of events in a data stream is the order in which those events were initiated on the writer; (events can be sent asynchronously, but it matters when the user has begun sending them). For large events, there are two choices for establishing the order, namely order-on-start or order-on-end, which the writer application specifies when initiating a multipart upload; (one can be specified by default). Alternatively, the order choice can be associated with the data stream, or even set on a per-routing key basis. Such a setting can be fixed, or alternatively fixed by default but allowed to be explicitly overridden.

For order-on-start, order is established based on when the multipart upload was initiated on the writer (which is consistent with classical ordering). To guarantee consistency, with order-on-start no reader may go past this large event until the multipart upload for this event has completed. This may cause readers to "stall" until the multipart upload is completed or aborted, which could be perceived as unwanted behavior in some scenarios.

For order-on-end, order is established based on when the multipart upload is completed. This is different than order-on-start, but it has the advantage of not blocking any readers that have read up to the time of multipart upload initiation, whereby the multipart upload may proceed while readers consume other events in the stream.

In general, order-on-end is for use cases where events are uploaded and the application does not need them to be in a strict order. For situations where order is needed, such as a video upload where the frames are ordered, order-on-start may be more suitable.

In the example of FIG. 3, there are three micro-transactions 331-333 associated with the event segment 330. For an order-on-start large event multipart upload, an event reference is appended to the data stream when the multipart upload is initiated. Further events can be appended by writer(s), but a reader is blocked by the event reference while the multipart upload is in progress. In contrast, for an order-on-end large event multipart upload, an event reference is appended to the data stream when the multipart upload completes.

Micro-transaction 332 corresponds to "MTS UID_2" and was an order-on-start large event that has completed, meaning that reading can continue past the event reference "MTS UID_2" in this example. In one implementation, the segment attribute for an order-on-start large event is "InProgress" until the event completes (or is otherwise canceled—e.g., aborted or abandoned/expired—as described herein), at which time the segment attribute for UID_2 can be changed to "Complete" or alternatively removed from the segment's attributes.

Micro-transaction 333 corresponds to "MTS UID_3" and was an order-on-start large event that is in progress {UID_3, InProgress}, meaning that reading cannot continue past the event reference "MTS UID_3" in this example until the event completes (or is canceled). The segment attribute {UID_3, InProgress} is set when the multipart upload is initiated and the micro-transaction 333 is created.

Micro-transaction 331 corresponds to "MTS UID_1" and was an order-on-end large event, whereby reading can continue past the initiation time of UID_1 in this example; (e.g., the initiation of UID_1 can have occurred between event E1 and event E2). There is no need for a UID_1 "In Progress" attribute because the event reference is not appended to the data segment until the multipart upload for UID_1 completes, and once a reader reaches the event reference for UID_1, the large data is present in the micro-transaction for reading as described herein.

By way of an example, consider an event E with length L (e.g., measured in bytes) and routing key RK that a user application wants to append to stream S via the normal append API, as shown at operation 402 of the flow diagram of FIG. 5. If, as evaluated at operation 404 the length does not exceed the limit for a regular sized event (e.g., L<=8 MB), this is a regular event, and the conventional ways of appending such an event apply, as represented by operation 406. Reading such an event is similarly conventional.

If not a regular sized event, operation 408 evaluates whether the event is a large event, or a slightly oversized event, e.g., whether L>100 MB; (this threshold value and other threshold values described herein are not hardcoded; an implementation may choose its own threshold values). If slightly oversized, e.g., L<=100 MB, operation 410 handles the event using a transparent (to the writer application) multipart upload, that is, the client component (rather than the writer application) automatically uses the multipart upload append/read operations described herein. Note that having the client component perform the multipart upload operations instead of the writer application is straightforward, and is performed on the write path alone.

If a large event is requested to be ingested via the traditional API, operation 412 rejects the event. The rejection indicates that the multipart upload API needs to be used with this event.

FIG. 5A shows one example implementation for storing large events in a micro-transaction data structure. In FIG. 5A, the event subparts (E-SP) 550 are stored to a micro-transaction segment (data structure) 552 in order based on their sequence number; (the sequence number need not be maintained in conjunction with the subpart data, but is shown in FIG. 5A for purposes of clarity). For example, assuming eight megabyte subparts of a one gigabyte large event, the offset location within the micro-transaction segment for each subpart is determined by that subpart's sequence number (minus one of the first sequence number is one) times eight megabytes, and the event data (payload, or PL) written to that location. Offset computation logic 554 can be incorporated into the client component or the segment store. Thus, in the example of FIG. 5A, event subpart sequence numbers 4 and 8 have not yet been received, but payload space at their respective offset locations remains available for storing their respective payloads when received. In alternative implementations, a sequence number is not needed if the writer application guarantees that subparts are provided in order, or the writer application does not care about ordering.

Subparts may not necessarily be appended in order as long as when reading them back, there is a way to read them in the correct order; (e.g., if received and appended as E1, E3, E4, E2, then E1, E2, E3, E4 needs to be returned). To take advantage of parallelization, for example, a writer application may open multiple physical connections via the client component to the micro-transaction's segment store and upload the subparts in parallel. In this case, each subpart needs to be tagged with the sequence number that indicates its order, so that a reader component may reconstruct the original event, e.g., for returning to a reader application.

FIG. 5B shows a micro-transaction data structure (segment) 556 in which event subparts 558 are appended in the order received, and order is tracked by maintaining offset metadata 560 that tracks the offset location in the micro-transaction segment of each subpart. Thus, when reading back a large event, the reader accesses the offset metadata to locate the first subpart in the micro-transaction segment, then the second subpart and so on to recreate the large event in order.

To append in conjunction with maintaining the offset data, each large event subpart (E-SP$_i$) is appended to the micro-transaction segment using a composite append comprised of the event subpart and a metadata attribute update of the offset of the event subpart {i:=Offset(E-SP$_i$)}. That is, the composite append maps i(E-SP$_i$'s sequence number) to the offset at which E-SP$_i$ was atomically written to the micro-transaction segment. Note that a composite append atomically appends specified data to a segment and updates that segment's (attribute) metadata with specified related information.

When reading, the reader can iterate through the micro-transaction segment's attributes and list the sequence number, offset pairs {i, o} and serve the data in ascending order of i (by reading E-SP$_i$ from offset o within the micro-transaction segment). It is also feasible to maintain the offsets in sequence number order in the metadata, particularly if there is a small number (e.g., 128) of subparts.

Figure 6:
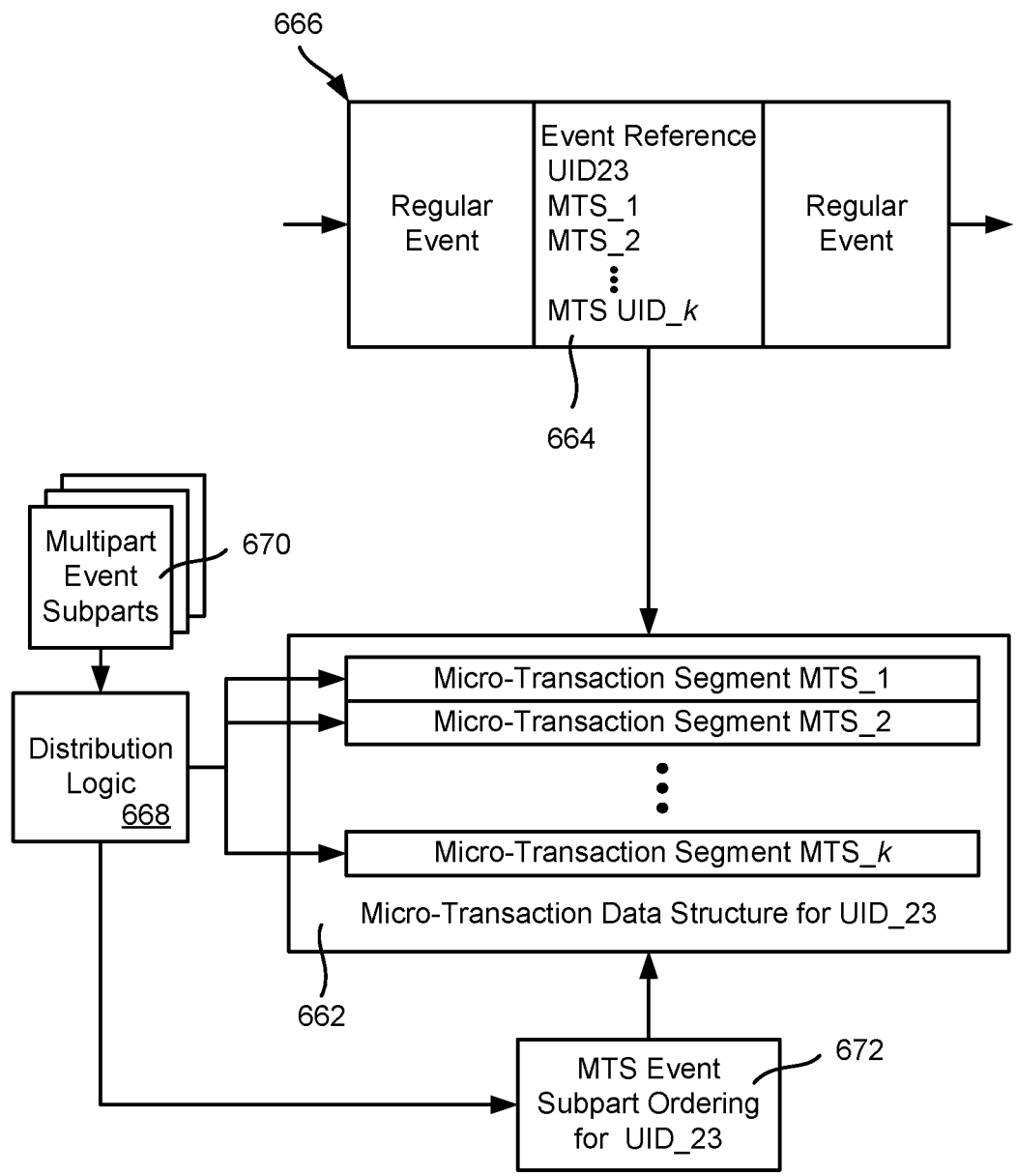
FIG. 6 is a block diagram representation of a micro-transaction data structure comprised of multiple micro-transaction segments, in accordance with various aspects and implementations of the subject disclosure.

The above-described operations generally use a single micro-transaction segment for the upload. However, as shown in FIG. 6, a plurality of micro-transaction segments may be used for the upload (which may help with parallelizing writes, as well as reads, thus leading to better resource utilization and performance):

Thus, instead of creating a single micro-transaction segment, a micro-transaction data structure 662 comprising multiple micro-transaction segments (MTS_1, . . . , MTS_k) can be created, where k can be defined by configuration or can be calculated based on the large event's size. The event reference 664 for the multiple micro-transaction segments are referenced in the event reference that is appended to the segment 666.

Via distribution logic 668, the event subparts 670 are equally allocated between the multiple micro-transaction segments (MTS_1, . . . , MTS_k), while making sure that their subpart order is preserved, (both within a single micro-transaction segment and across multiple micro-transaction segments), e.g., in micro-transaction segment event subpart ordering metadata 672. As described below, when sealing upon completion, the micro-transaction segments are sealed together. Similarly, when merging to the segment as described below, the merging operation atomically merges the multiple micro-transaction segments, in ascending order (e.g., of MTS_1, . . . , MTS_k). When deleting, the multiple micro-transaction segments are likewise deleted together. Reading from multiple micro-transaction segments is described below.

Figure 7:
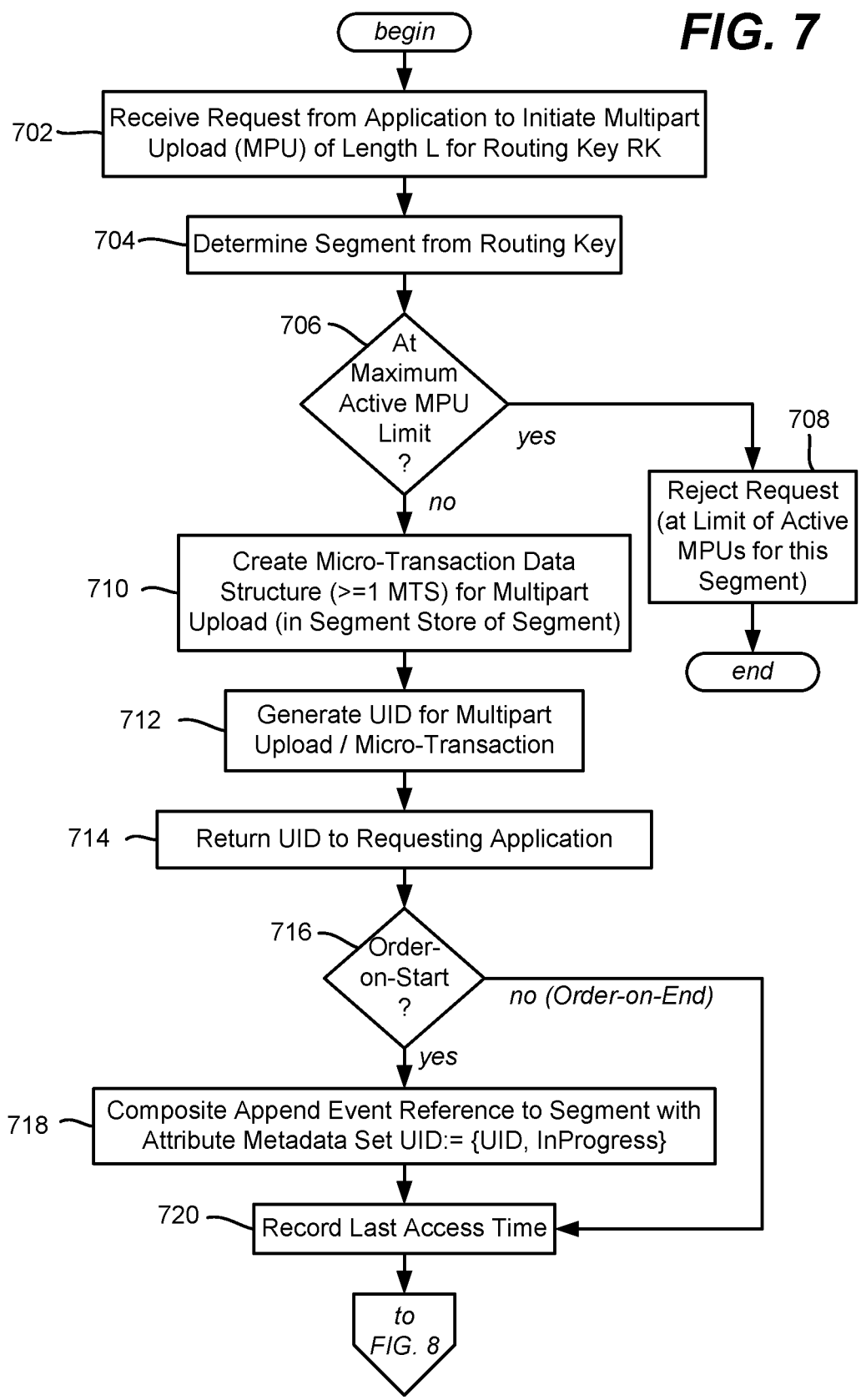
FIGS. 7 and 8 comprise a flow diagram showing example operations related to writing a large event, in accordance with various aspects and implementations of the subject disclosure.
Figure 8:
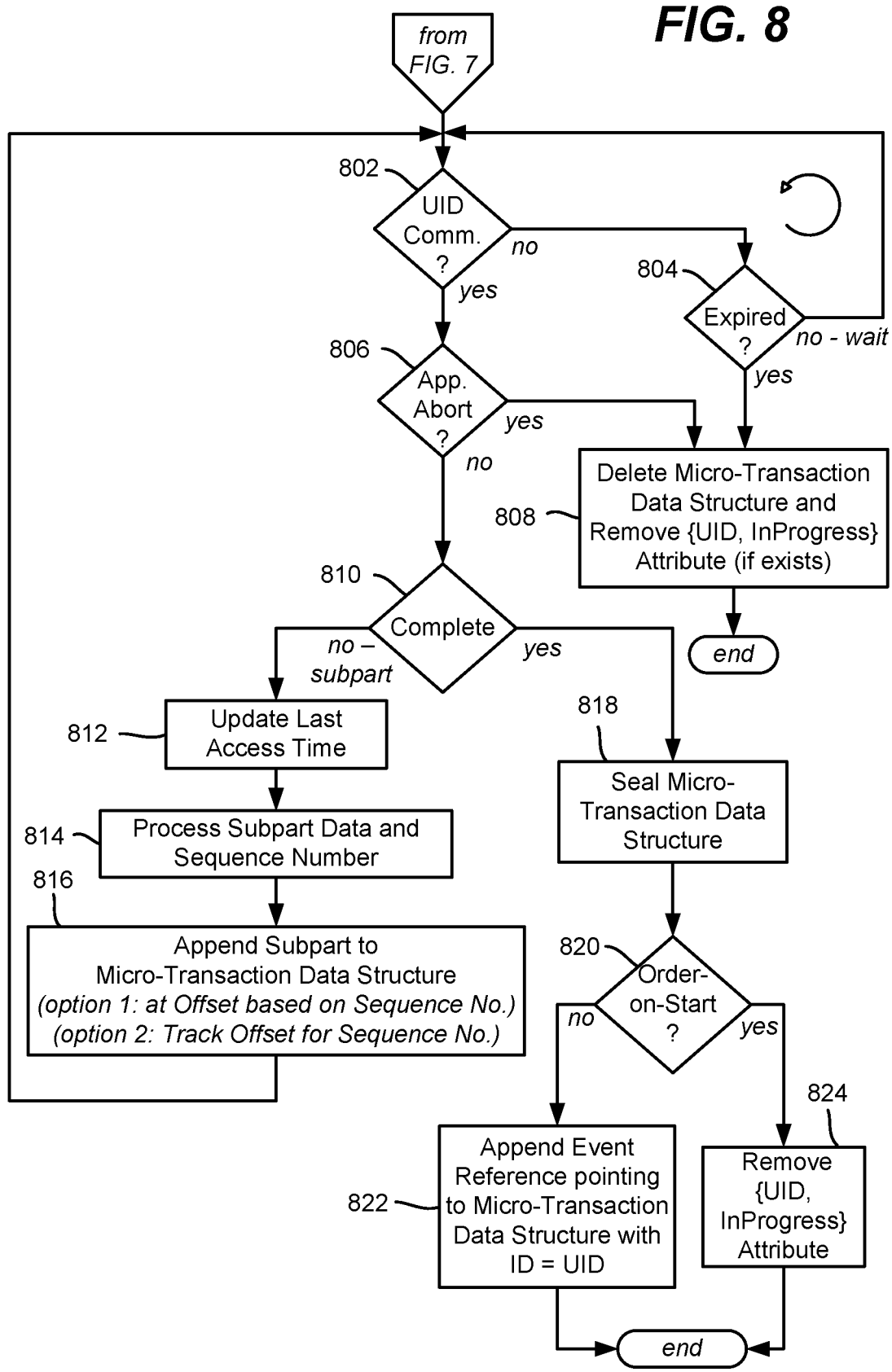

FIGS. 7 and 8 describe the write operations for large events, beginning at operation 702 of FIG. 7 where the client component receives a request from a user writer application to initiate a multipart upload, which includes a routing key and a length value. Optionally the user application may specify the order choice (order-on-start or order-on-end, or one of the alternatives/defaults as described above can choose). Note that the multipart upload initiate request can be accompanied by a subpart of the data, e.g., the first subpart, although having a separate multipart upload initiate request is straightforward.

As with conventional events, the client component uses the routing key (operation 704) to determine the stream segment (part of the stream) to which the routing key maps; this is done as before by querying the controller, which, in turn, queries controller metadata for the appropriate data stream, and responds with the segment identifier. If at the maximum limit for active multipart uploads for this segment's segment store as evaluated at operation 706, operation 708 rejects the request, e.g., specifying the active limit having been reached as the reason.

Otherwise, at operation 710 the client component instructs the segment store that is responsible for handling the segment to create a micro-transaction segment that is associated with the segment. The segment store creates the requested micro-transaction segment. Note however that operation 710 refers to a micro-transaction "data structure," which may be comprised of one or more micro-transaction segments, as described above with reference to FIG. 6.

Operation 712 generates a unique identifier (UID) for the multipart upload/micro-transaction data structure. The unique identifier may have a name that is derived from the segment, along with an additional unique identifier part such as a sequential or random number. The micro-transaction data structure is thereby associated with the segment (that is, the micro-transaction data structure is a dependent of the segment). For example, if the segment is deleted, then the micro-transaction data structure is also deleted. Operation 714 returns the unique identifier to the requesting application.

Operation 716 evaluates the order choice. If the order choice is order-on-end, nothing else needs to be done at this operation, and the process branches to operation 720. If the order choice is order-on-start, then at operation 718 a composite append is made to the segment, which appends an event reference to the micro-transaction data structure and updates an attribute setting for this segment to indicate that this multipart upload is in progress, {UID, InProgress}, e.g., an attribute pair. Note that an event reference is a specific type of event that does not contain any event data, but rather contains a reference to the micro-transaction data structure and micro-transaction data structure's UID.

Setting the attribute to InProgress indicates that the micro-transaction data structure with the UID identifier has been created but it has not yet been finalized (committed, aborted or abandoned). An implementation may substitute a Boolean value, a number or any other binary state representation for (InProgress).

As set forth above, an expiration time may be set that aborts the multipart upload in the event of inactivity. For example, it is possible that the user uploading a large event no longer wants to pursue the upload, or the writer application crashed, or the user somehow "forgot" about the upload. Automatic expiration can be performed in various ways as described herein, including by recording the current time as a "last access time" at operation 720 that is used to expire the multipart upload if inactive for too long.

For example, the segment store or the stream itself may be configured with a "multipart upload expiration time". If no activity has happened on the micro-transaction data structure (micro-transaction segment(s)) in this amount of time, then the multipart upload associated with the micro-transaction data structure is considered abandoned. For any micro-transaction segment (or micro-transaction data structure comprised of multiple micro-transaction segments), the segment store keeps track of the last-access-time. The last-access-time is updated (operation 812 of FIG. 8) each time an append is received for the micro-transaction data structure or when the micro-transaction data structure is sealed. It is alternatively feasible to keep an expiration timer for each micro-transaction data structure (one or more micro-transaction segments) and reset the timer upon activity.

Operation 802 of FIG. 8 evaluates whether there is a communication (activity) regarding the UID of the multipart upload. If not, operation 804 waits for some activity until the expiration time limit (current time minus last access time) is reached; (expiration can actually be event driven rather than a loop). If expired, operation 808 is performed to clean up and remove the micro-transaction data structure (the one or more micro-transaction segments) and any metadata, including the {UID, InProgress} attribute (if order-on-start, that is, the attribute does exist for this UID).

It is also possible for the user/writer application to expressly abort a multipart upload/micro-transaction: To this end a communication is received at operation 802, but is determined via operation 806 that this is an abort request, that is, the writer application requests that the segment store owning the micro-transaction data structure delete (operation 808) the micro-transaction data structure (which also removes the {UID, InProgress} attribute (if any) from the segment's metadata.

In general, a multipart upload results in some micro-transaction data structure having been created on the segment store, and if aborted or abandoned, cleanup is needed to reclaim the resources. There are various ways to perform cleanup. For example, the segment store may run a background job (e.g., operation 808 need not be performed in the foreground) that checks for active micro-transaction data structures. For any micro-transaction data structure that has the current time minus its last access time (LAT) greater than the expiration time limit (Now—LAT>Expiration Time), the segment store may delete the micro-transaction data structure and any related metadata. An alternative is that upon a write to a micro-transaction data structure, the segment store may start a system timer that elapses on the last access time. If no other activity occurred in this time period, the micro-transaction data structure is deleted as described herein, along with any related metadata.

In a likely more typical scenario, the multipart upload continues until complete. Operation 810 evaluates the communication regarding the multipart upload, and if a subpart, operation 812 updates the last access time, and operation 814 processes the subpart data (e.g., separates the payload from any event header) and sequence number, if any. Operation 816 appends the subpart to the micro-transaction data structure (to a single micro-transaction segment or to a distributed one of multiple micro-transaction segments). Note that operation 818 can store the subpart in order, or track offset metadata to maintain the order, as described above with reference to FIGS. 5A and 5B, respectively. The process then returns to operation 802 for the next subpart, or another communication.

Eventually a successful multipart upload completes at operation 810, whereby operation 818 is performed to seal the micro-transaction data structure (the one or more micro-transaction segments). If at operation 820 the multipart upload was an order-on-end upload, operation 822 appends an event reference to the now sealed micro-transaction data structure's segment(s), which merges the micro-transaction segment(s) into the segment. If at operation 820 the multipart upload was an order-on-start upload, (the event reference is already in the segment), operation 824 merges the micro-transaction segment(s) by removing the {UID, InProgress} attribute from the segment's attribute metadata. An alternative is to change the state to {UID, Complete} as described above. Note that updating the status to {Complete} is less practical than removing the attribute, particularly because there can be on the order of millions of large events per segment, and once completed, this extra attribute metadata no longer serves a purpose.

To summarize the writing operations, the application writer (or client component) breaks a large event into subparts. The number of subparts depends on the event size and the maximum event size supported on the streaming data storage system (e.g., eight megabytes).

The client appends the subparts to the micro-transaction segment(s), e.g., in sequence order or in the order received (while tracking the sequence order) and seals the micro-transaction segment(s) when complete. Note that the micro-transaction segment(s) are handled by the same segment store instance as the segment, whereby the requests can be routed to that instance.

The client instructs the segment store that owns the micro-transaction segment(s) to merge the micro-transaction segment(s) into the segment. If order-on-end, then the segment store appends an event reference to the segment pointing to the micro-transaction segment(s), with the identifier of UID; (note there is no setting to {InProgress} at this step, as the multipart upload is complete and no status attribute is needed). If order-on-start, then the segment store updates the segment's metadata to remove the attribute pair {UID, InProgress}, or change its state to complete.

Figure 9:
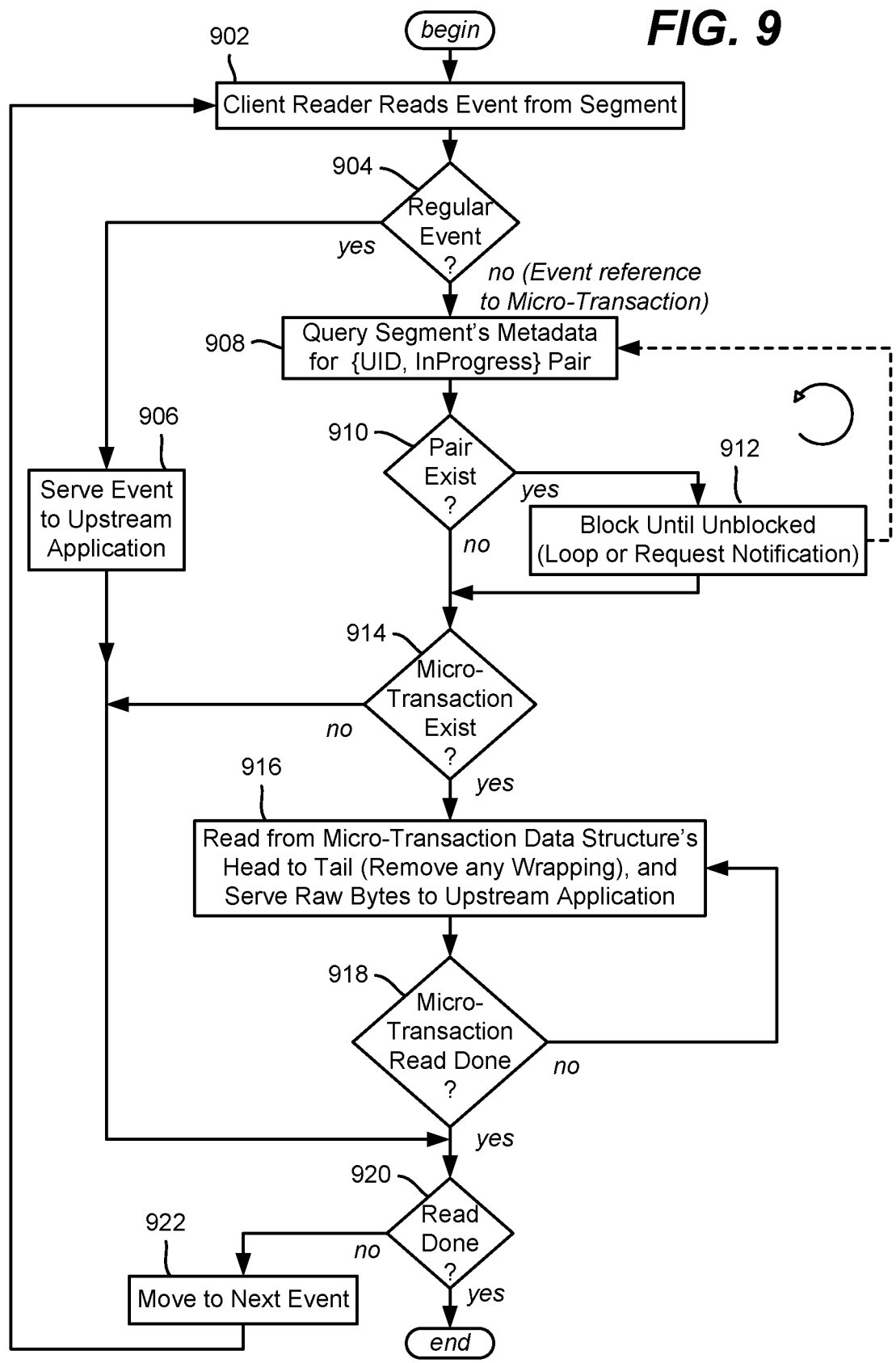
FIG. 9 is a flow diagram showing example operations related to reading a data segment that includes a large event, in accordance with various aspects and implementations of the subject disclosure.

FIG. 9 summarizes read operations with respect to reading events from a segment that includes a multipart upload (and possibly regular events). Note that when a reader processes a segment, the reader client component reads the segment sequentially, from its head (beginning) to its tail (end). The reader client component reads each event in order and serves the event to upstream applications as before. To ensure ordering and consistency, readers may not skip events or produce them out of order. As such, the reader needs to handle those micro-transaction data structure event references that may exist in the segment. Note that for purposes of explanation, the one or more micro-transaction segment(s) are referred to as a micro-transaction data structure, comprised of the one or more micro-transaction segments as described herein.

Thus, FIG. 9 shows read-related operations, beginning at operation 902 where the client component reader reads an event on behalf of an upstream reader application program. If the event is a regular event, as evaluated at operation 904, then reading continues as normal at operation 906 to serve that event to the requesting upstream reader application.

If instead the reader encounters an event reference to a micro-transaction data structure with an identifier of UID, operation 908 queries the segment's metadata to determine whether the multipart upload is in progress, in which event reading is blocked via operation 912. That is, if the pair {UID, InProgress} exists, the reader blocks until this pair no longer exists (or, in some implementations, is replaced with {UID, Complete} or equivalent). Blocking can be done in a tight loop, or can be performed by requesting that the segment store notify the reader when one the micro-transaction data structure is deleted, the segment to which the micro-transaction data structure belongs is deleted or sealed, or the metadata pair is deleted (or updated). Only when blocking ends can the reader proceed to operation 914.

Note that if the segment becomes sealed, then there is no way the large event that is still pending can ever be appended to the segment. In this case, it is safe to skip this event reference and move on to the next event in segment. If the segment is deleted, either the stream was deleted or a retention policy deleted the segment and reading cannot continue; such an error condition is to be bubbled to upstream code. Note that this can happen even while reading regular events. Although not explicitly shown in FIG. 9, it is understood that these operations exist to evaluate for a sealed segment (which skips over a previously blocked event reference) or a deleted segment/stream (which returns an error).

Operation 914 evaluates whether the micro-transaction data structure (segment(s)) does not exist. If the micro-transaction data structure does not exist, the then the multipart upload associated with it was aborted or expired. In this situation, the reader component skips over this event reference and advances to operation 920, described below.

If the micro-transaction data structure exists, the reader serves the content of the micro-transaction segment(s), in order, to the upstream code. This may need to be based on locating the correct micro-transaction segment (if multiple micro-transaction segments were written as in FIG. 6, e.g., alternating, in ascending order), as well as ordering based on offset location in a micro-transaction segment if the events were not appended in sequential order. The content returned thus corresponds to a large event that was appended using the operations of FIGS. 7 and 8.

For a large event, at operation 916 the reader component reads from the micro-transaction segment(s) head(s) and serves the raw bytes to the upstream code, restoring the sequential subpart ordering as needed. Note that even though the data was appended as individual subparts ("sub-events") to the micro-transaction segment(s), if the implementation wraps them in an envelope (with a header, for example), the reader component serves the contents and ignores the envelope.

Operation 918 continues the reading until the entire content of the micro-transaction segment(s) has been served to the upstream code. Note that while read as eight megabyte subparts, any practical amount of data can be returned to the upstream application, including the entire (e.g., one gigabyte) large event at once, or streamed in some way (e.g., 128 megabytes at a time). At this time, operation 918 branches to operation 920.

At operation 920, it is possible that reading is done, e.g., because the tail of the segment has been reached. It not done, the reader component returns to operation 902 to proceed with reading the next event (or an event reference to a large event) in the segment.

Figure 10:
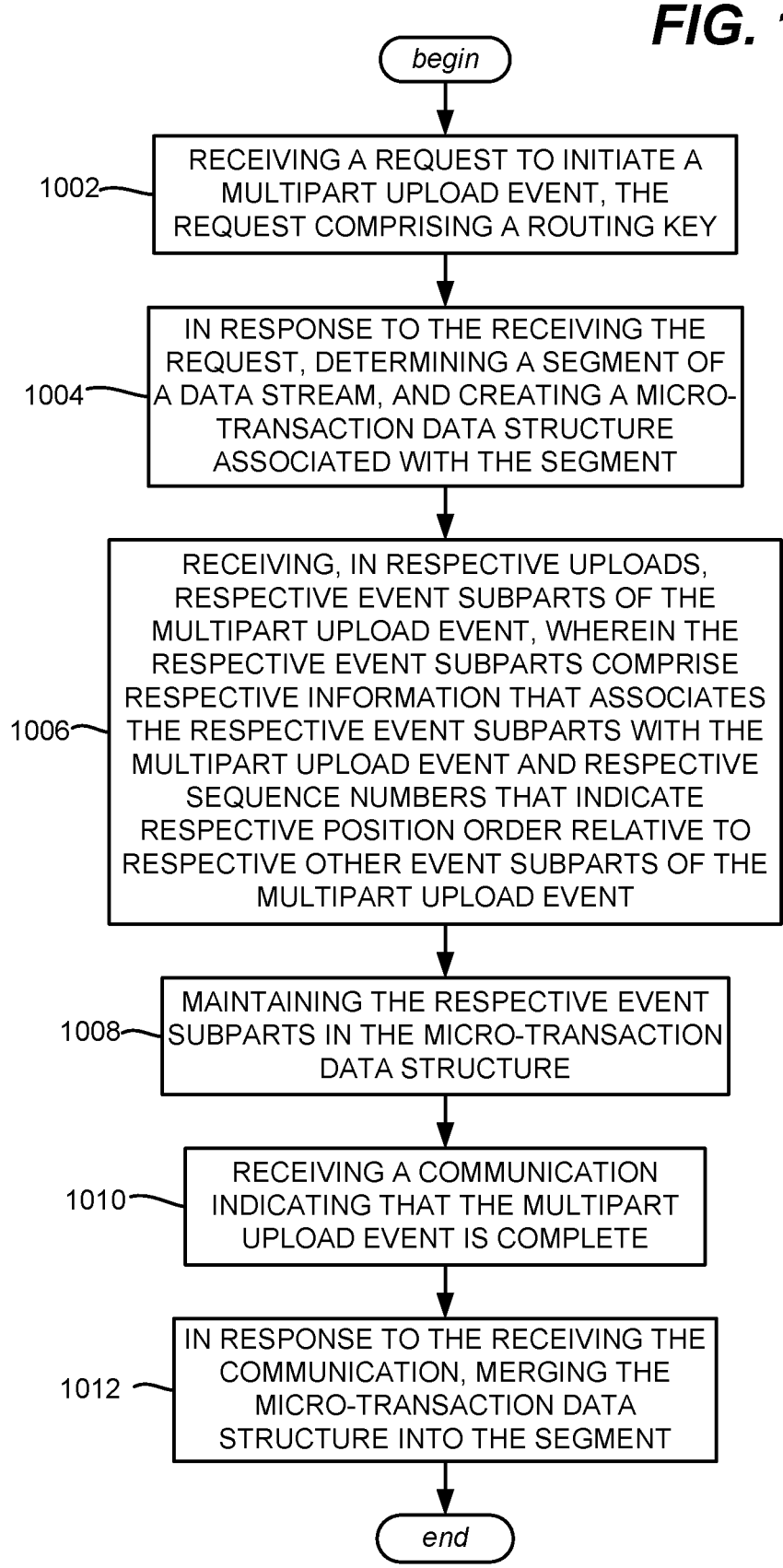
FIG. 10 is a flow diagram showing example writing operations related to a large event, in accordance with various aspects and implementations of the subject disclosure.

One or more implementations can be embodied in a system, such as represented in FIG. 10 and for example can comprise a memory that stores computer executable components and/or operations, and a processor that executes computer executable components and/or operations stored in the memory. Example operations can comprise operation 1002, which represents receiving a request to initiate a multipart upload event, the request comprising a routing key. Operation 1004 represents, in response to the receiving the request, determining a segment of a data stream, and creating a micro-transaction data structure associated with the segment. Operation 1006 represents receiving, in respective uploads, respective event subparts of the multipart upload event, wherein the respective event subparts comprise respective information that associates the respective event subparts with the multipart upload event and respective sequence numbers that indicate respective position order relative to respective other event subparts of the multipart upload event. Operation 1008 represents maintaining the respective event subparts in the micro-transaction data structure. Operation 1010 represents receiving a communication indicating that the multipart upload event is complete. Operation 1012 represents, in response to the receiving the communication, merging the micro-transaction data structure into the segment.

The micro-transaction data structure can be maintained in a segment store that maintains the segment. Further operations can comprise determining that a total number of active micro-transactions associated with the segment store has not reached a defined upper limit. Further operations can comprise associating an identifier with the micro-transaction data structure that is a unique identifier within the segment store.

The micro-transaction data structure can comprise a group of micro-transaction segments, and maintaining the respective event subparts in the micro-transaction data structure can comprise distributing the respective event subparts among the group of micro-transaction segments.

The multipart upload event can be associated with an order-on-start order choice indicator that blocks readers from reading beyond an event reference to the micro-transaction data structure in the segment until the multipart upload event completes. The event reference can be appended to the segment in a composite append operation with an attribute of the segment that indicates the multipart upload event is in progress, and, upon merging the micro-transaction data structure into the segment, the attribute can be changed to complete or the attribute is removed.

The multipart upload event can be associated with an order-on-end order choice indicator, and merging the micro-transaction data structure into the segment can comprise appending an event reference to the micro-transaction data structure in the segment.

The micro-transaction data structure can be maintained in a segment store that maintains the segment, the segment store can comprise a component of a data streaming storage platform, the request to initiate the multipart upload event can be received by a client component of the data streaming storage platform coupled to a writer application that uploads the respective event subparts to the client component, the client component can determine the segment via communication with a controller of the data streaming storage platform coupled to the client component, the client component can communicate with the segment store that maintains the segment, and the segment store can create the micro-transaction data structure associated with the segment.

Respective event subparts can be appended in order based on the respective sequence numbers, and further operations further can comprise serving first event data from the segment, encountering a multipart event reference that identifies the micro-transaction data structure, determining whether the multipart upload event is in progress, in response to determining that the multipart upload event is in progress, blocking reading until an unblocked state is determined, in response to determining the unblocked state, determining whether the micro-transaction data structure identified in the multipart event reference exists, and in response to determining that the micro-transaction data structure identified in the multipart event reference exists, serving event data from the micro-transaction data structure.

The respective event subparts can be associated with respective sequence numbers, the respective event subparts need not appended in order with respect to the respective sequence numbers, and further operations can comprise serving event data from the segment, encountering a multipart event reference that identifies the micro-transaction data structure, determining that the multipart upload event is not in progress, determining that the micro-transaction data structure identified in the multipart event reference exists, reading the respective event subparts from the micro-transaction data structure, obtaining the respective sequence numbers of the respective event subparts, and serving event data from the micro-transaction data structure in sequence number order based on the respective sequence numbers of the respective event subparts.

Serving event data from the micro-transaction data structure in sequence number order based on the respective sequence numbers of the respective event subparts can comprise accessing metadata that maps the respective sequence numbers to offset locations of the respective event subparts in the micro-transaction data structure.

The multipart upload event can be a first multipart upload event, the micro-transaction data structure can be a first micro-transaction data structure, the segment can be a first segment, the request can be a first request, the respective event subparts can be first respective event subparts, the respective information can be first respective information, the respective sequence numbers that indicate respective position order relative to other event subparts of the first multipart upload event can be first respective sequence numbers that indicate first respective position order relative to first respective other event subparts of the first multipart upload event, and further operations can comprise receiving a second request to initiate a second multipart upload event, the second request comprising a second routing key, in response to the receiving the second request, determining a second segment of the data stream, and creating a second micro-transaction data structure associated with the second segment, receiving, in respective uploads, second respective event subparts of the second multipart upload event, wherein the second respective event subparts comprise second respective information that associates the second respective event subparts with the second multipart upload event and second respective sequence numbers that indicate second respective position order relative to second respective other event subparts of the second multipart upload event, maintaining the second respective event subparts in the second micro-transaction data structure, and in response to receiving a communication that the second multipart upload event is abandoned, or in response to the determining that the multipart upload event is expired before completion as a result of inactivity, deleting the second micro-transaction data structure.

Figure 11:
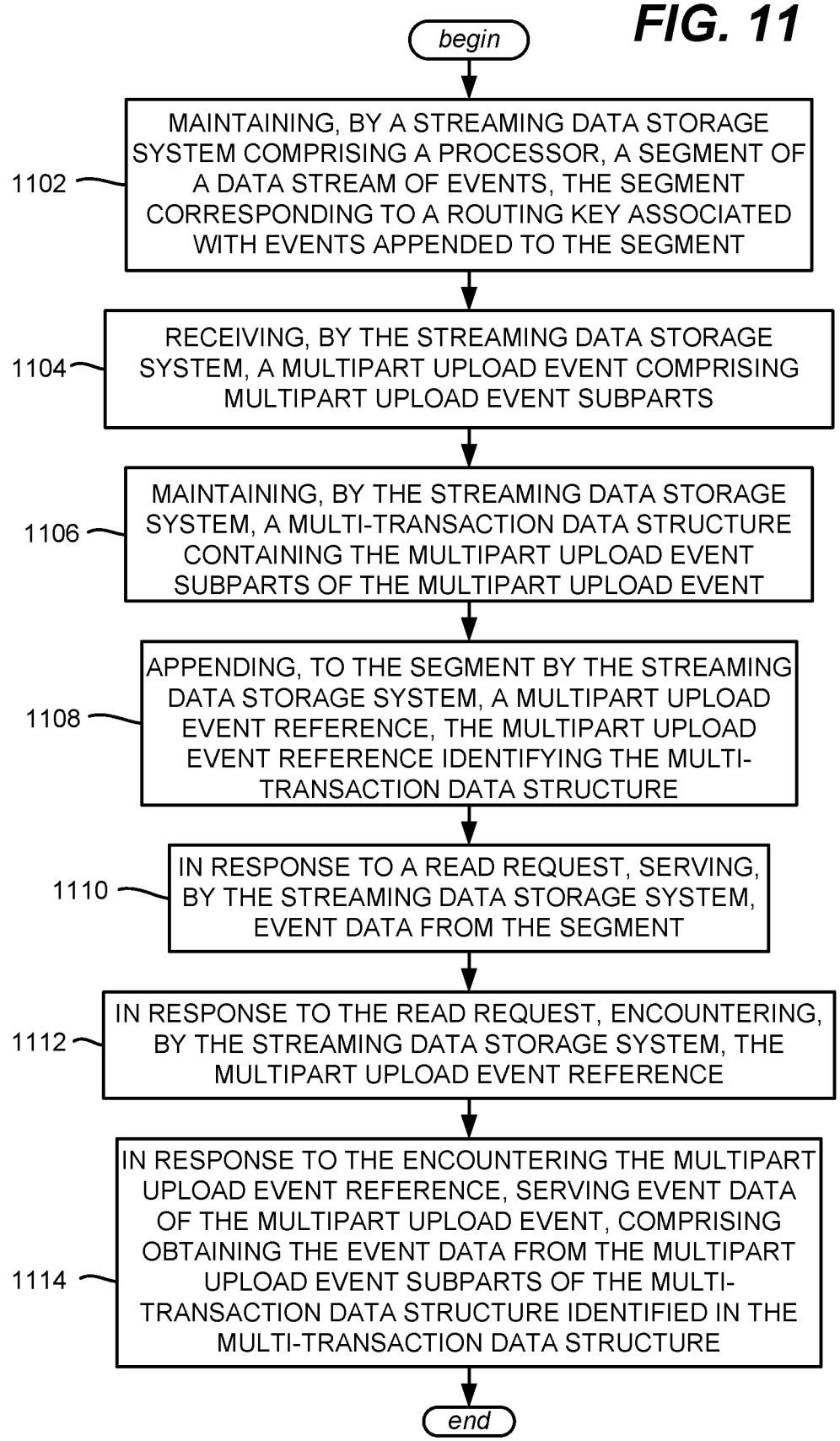
FIG. 11 is a flow diagram showing example reading operations related to a large event, in accordance with various aspects and implementations of the subject disclosure.

One or more example implementations, such as corresponding to example operations of a method, are represented in FIG. 11. Operation 1102 represents maintaining, by a streaming data storage system comprising a processor, a segment of a data stream of events, the segment corresponding to a routing key associated with events appended to the segment. Operation 1105 represents receiving, by the streaming data storage system, a multipart upload event comprising multipart upload event subparts. Operation 1106 represents maintaining, by the streaming data storage system, a multi-transaction data structure containing the multipart upload event subparts of the multipart upload event. Operation 1108 represents appending, to the segment by the streaming data storage system, a multipart upload event reference, the multipart upload event reference identifying the multi-transaction data structure. Operation 1110 represents, in response to a read request, serving, by the streaming data storage system, event data from the segment. Operation 1112 represents, in response to the read request, encountering, by the streaming data storage system, the multipart upload event reference. Operation 1114 represents, in response to the encountering the multipart upload event reference, serving event data of the multipart upload event, comprising obtaining the event data from the multipart upload event subparts of the multi-transaction data structure identified in the multi-transaction data structure.

Appending, to the segment, the multipart upload event reference can comprise appending the multipart upload event reference after the multipart upload event has been determined to be complete.

Appending, to the segment, the multipart upload event reference can comprise appending the multipart upload event reference after the multipart upload event has been determined to have started, and setting, by the streaming data storage system, an attribute associated with the segment to indicate that the multipart upload event is in progress, blocking, by the streaming data storage system, reading from the segment beyond the multipart upload event reference while the attribute indicates that the multipart upload event is in progress, and clearing, by the streaming data storage system, the attribute after the multipart upload event has been determined to be complete to unblock reading from the segment.

Each multipart upload event subpart of the multipart upload event subparts can be associated with a sequence number that represents a position order in the multipart upload event relative to positions of other ones of the multipart upload event subparts, and maintaining the multi-transaction segment can comprise maintaining the multipart upload event subparts in sequential order, according to sequence number, in the multi-transaction segment.

Multipart upload event subparts can be associated with respective sequence numbers that represent respective relative position orders of the respective multipart upload event subparts in the multipart upload event, maintaining the multi-transaction segment can comprise maintaining the respective sequence numbers with the respective multipart upload event subparts, and serving the event data of the multipart upload event can comprise reading the respective multipart upload event subparts and the respective sequence numbers, and serving the event data from the respective multipart upload event subparts in sequential order based on the respective sequence numbers.

Figure 12:
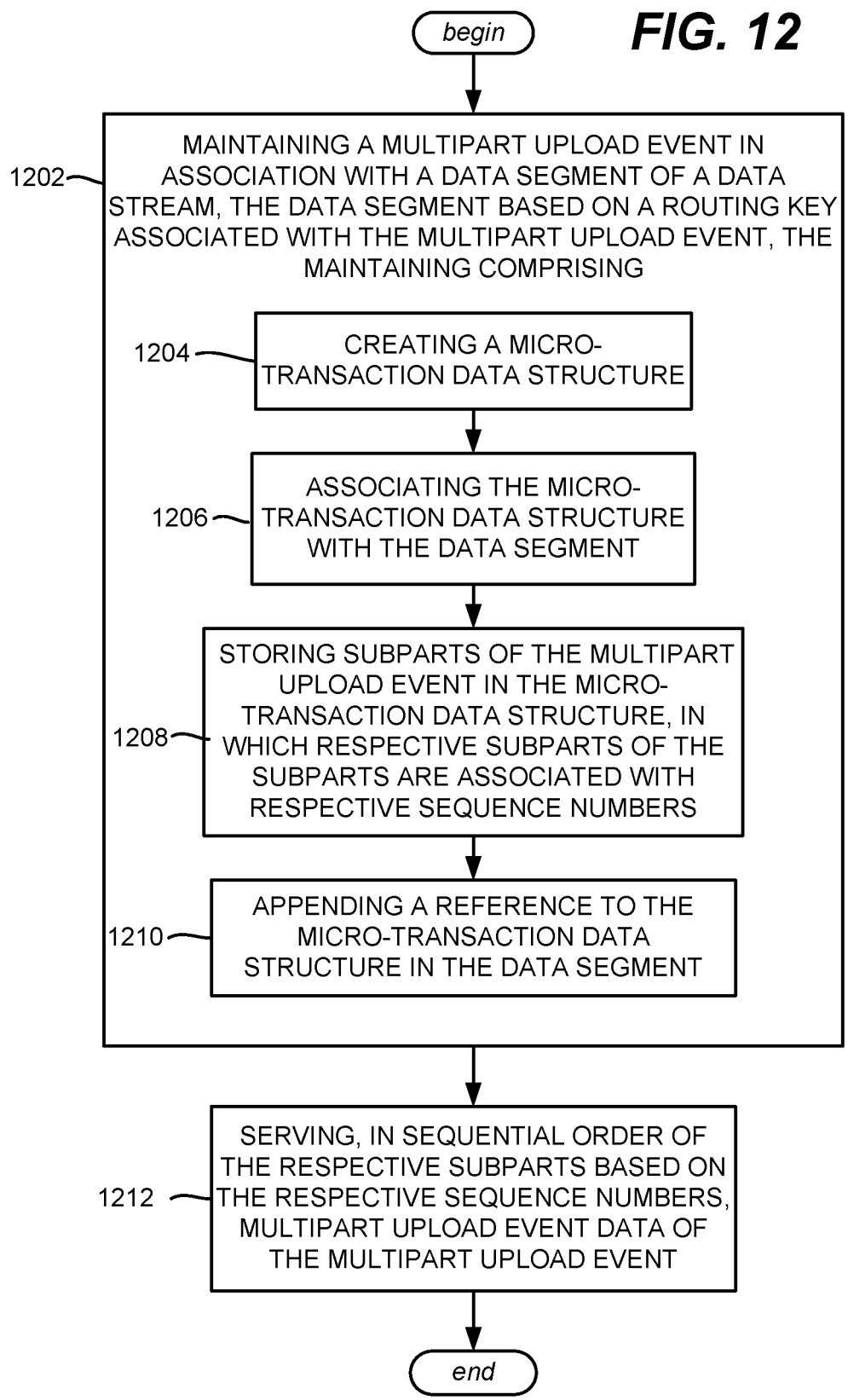
FIG. 12 is a flow diagram showing example operations related to writing and reading a large event, in accordance with various aspects and implementations of the subject disclosure.

FIG. 12 summarizes various example operations, e.g., corresponding to a machine-readable storage medium, comprising executable instructions that, when executed by a processor of a streaming data storage system, facilitate performance of operations. Operation 1202 represents maintaining a multipart upload event in association with a data segment of a data stream, the data segment based on a routing key associated with the multipart upload event, the maintaining comprising creating a micro-transaction data structure (operation 1204), associating the micro-transaction data structure with the data segment (operation 1206), storing subparts of the multipart upload event in the micro-transaction data structure, in which respective subparts of the subparts are associated with respective sequence numbers (operation 1208), and appending a reference to the micro-transaction data structure in the data segment (operation 1210). Operation 1212 represents serving, in sequential order of the respective subparts based on the respective sequence numbers, multipart upload event data of the multipart upload event.

When the subparts of the multipart upload event stored in the micro-transaction data structure are not stored in sequential order, serving the multipart upload event data can comprise obtaining the respective sequence numbers of the respective subparts, and returning event data from the respective subparts in sequential order based on the respective sequence numbers.

Figure 13:
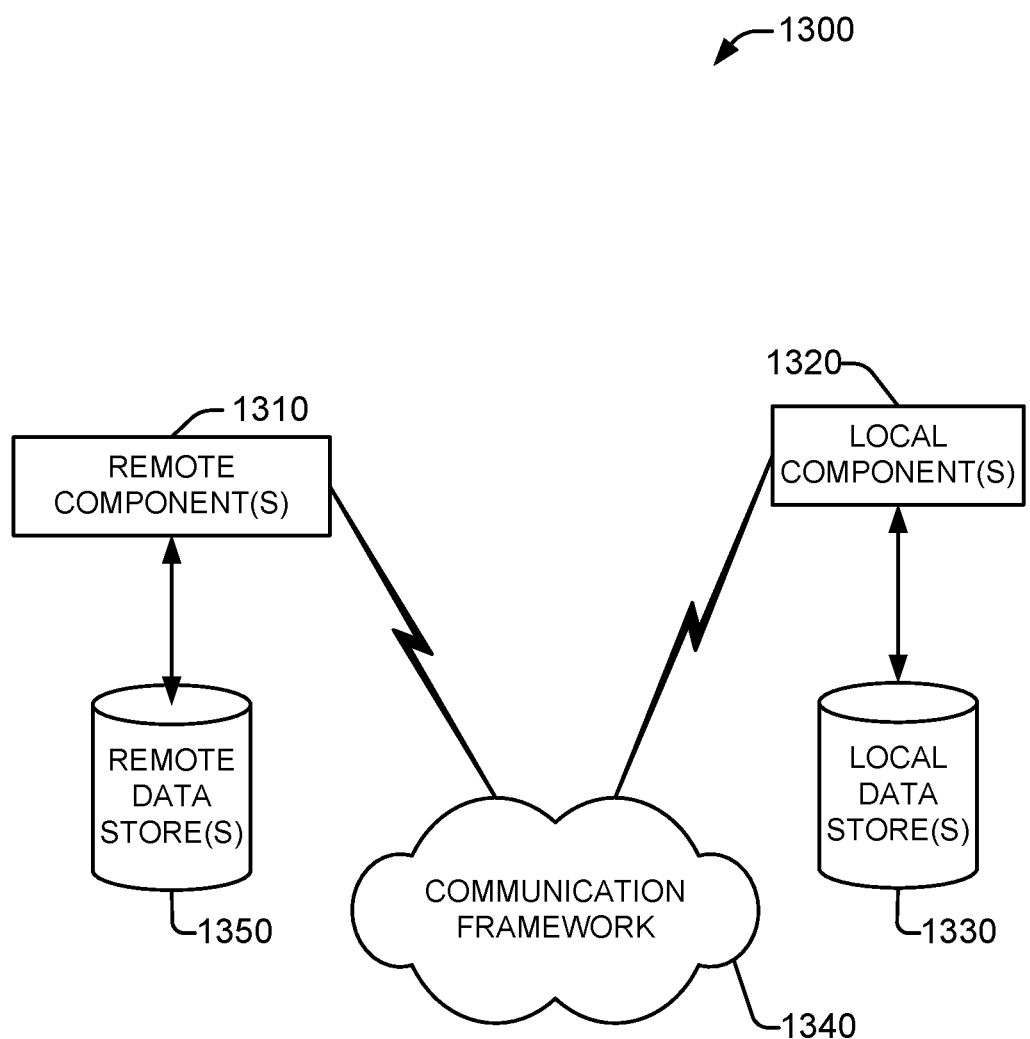
FIG. 13 is a block diagram representing an example computing environment into which aspects of the subject matter described herein may be incorporated.

As can be seen, the technology described herein practical to implement, and provides support for large events, e.g., including events up to one gigabyte in size. The technology is low-overhead, and assures high throughput for large events without introducing added pressure on system resources (e.g., RAM). The technology can be an extension to current streaming data storage system implementations, including that the technology does not worsen streaming data storage system performance characteristics for normal events. Indeed, the read/write performance of large events generally matches the read/write performance of the same amount of data represented with normal events FIG. 13 is a schematic block diagram of a computing environment 1300 with which the disclosed subject matter can interact. The system 1300 comprises one or more remote component(s) 1310. The remote component(s) 1310 can be hardware and/or software (e.g., threads, processes, computing devices). In some embodiments, remote component(s) 1310 can be a distributed computer system, connected to a local automatic scaling component and/or programs that use the resources of a distributed computer system, via communication framework 1340. Communication framework 1340 can comprise wired network devices, wireless network devices, mobile devices, wearable devices, radio access network devices, gateway devices, femtocell devices, servers, etc.

The system 1300 also comprises one or more local component(s) 1320. The local component(s) 1320 can be hardware and/or software (e.g., threads, processes, computing devices). In some embodiments, local component(s) 1320 can comprise an automatic scaling component and/or programs that communicate/use the remote resources 1310 and 1320, etc., connected to a remotely located distributed computing system via communication framework 1340.

One possible communication between a remote component(s) 1310 and a local component(s) 1320 can be in the form of a data packet adapted to be transmitted between two or more computer processes. Another possible communication between a remote component(s) 1310 and a local component(s) 1320 can be in the form of circuit-switched data adapted to be transmitted between two or more computer processes in radio time slots. The system 1300 comprises a communication framework 1340 that can be employed to facilitate communications between the remote component(s) 1310 and the local component(s) 1320, and can comprise an air interface, e.g., Uu interface of a UMTS network, via a long-term evolution (LTE) network, etc. Remote component(s) 1310 can be operably connected to one or more remote data store(s) 1350, such as a hard drive, solid state drive, SIM card, device memory, etc., that can be employed to store information on the remote component(s) 1310 side of communication framework 1340. Similarly, local component(s) 1320 can be operably connected to one or more local data store(s) 1330, that can be employed to store information on the local component(s) 1320 side of communication framework 1340.

Figure 14:
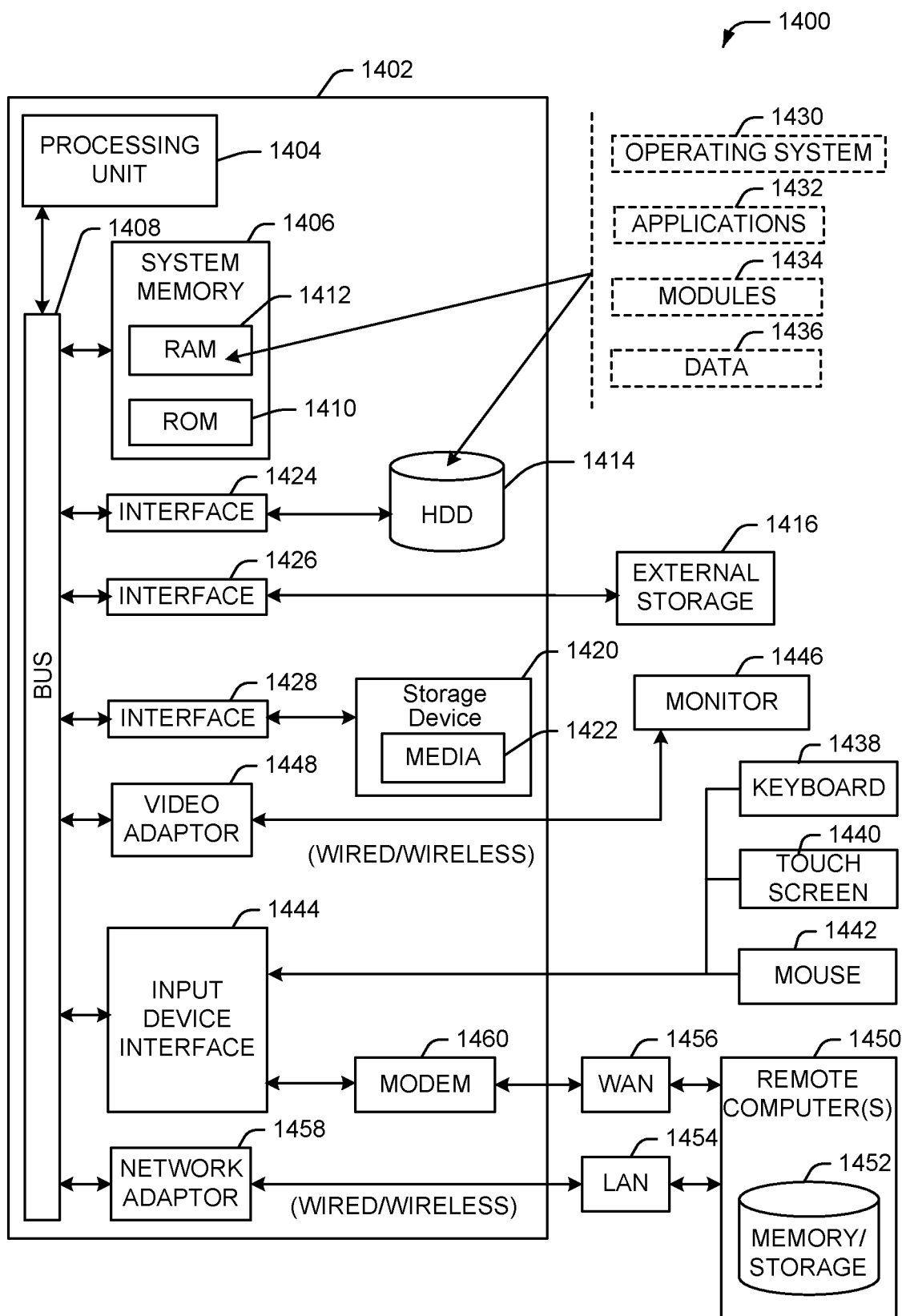
FIG. 14 depicts an example schematic block diagram of a computing environment with which the disclosed subject matter can interact/be implemented at least in part, in accordance with various aspects and implementations of the subject disclosure.

In order to provide additional context for various embodiments described herein, FIG. 14 and the following discussion are intended to provide a brief, general description of a suitable computing environment 1400 in which the various embodiments of the embodiment described herein can be implemented. While the embodiments have been described above in the general context of computer-executable instructions that can run on one or more computers, those skilled in the art will recognize that the embodiments can be also implemented in combination with other program modules and/or as a combination of hardware and software.

Generally, program modules include routines, programs, components, data structures, etc., that perform particular tasks or implement particular abstract data types. Moreover, those skilled in the art will appreciate that the methods can be practiced with other computer system configurations, including single-processor or multiprocessor computer systems, minicomputers, mainframe computers, Internet of Things (IoT) devices, distributed computing systems, as well as personal computers, hand-held computing devices, microprocessor-based or programmable consumer electronics, and the like, each of which can be operatively coupled to one or more associated devices.

The illustrated embodiments of the embodiments herein can be also practiced in distributed computing environments where certain tasks are performed by remote processing devices that are linked through a communications network. In a distributed computing environment, program modules can be located in both local and remote memory storage devices.

Computing devices typically include a variety of media, which can include computer-readable storage media, machine-readable storage media, and/or communications media, which two terms are used herein differently from one another as follows. Computer-readable storage media or machine-readable storage media can be any available storage media that can be accessed by the computer and includes both volatile and nonvolatile media, removable and non-removable media. By way of example, and not limitation, computer-readable storage media or machine-readable storage media can be implemented in connection with any method or technology for storage of information such as computer-readable or machine-readable instructions, program modules, structured data or unstructured data.

Computer-readable storage media can include, but are not limited to, random access memory (RAM), read only memory (ROM), electrically erasable programmable read only memory (EEPROM), flash memory or other memory technology, compact disk read only memory (CD-ROM), digital versatile disk (DVD), Blu-ray disc (BD) or other optical disk storage, magnetic cassettes, magnetic tape, magnetic disk storage or other magnetic storage devices, solid state drives or other solid state storage devices, or other tangible and/or non-transitory media which can be used to store desired information. In this regard, the terms "tangible" or "non-transitory" herein as applied to storage, memory or computer-readable media, are to be understood to exclude only propagating transitory signals per se as modifiers and do not relinquish rights to all standard storage, memory or computer-readable media that are not only propagating transitory signals per se.

Computer-readable storage media can be accessed by one or more local or remote computing devices, e.g., via access requests, queries or other data retrieval protocols, for a variety of operations with respect to the information stored by the medium.

Communications media typically embody computer-readable instructions, data structures, program modules or other structured or unstructured data in a data signal such as a modulated data signal, e.g., a carrier wave or other transport mechanism, and includes any information delivery or transport media. The term "modulated data signal" or signals refers to a signal that has one or more of its characteristics set or changed in such a manner as to encode information in one or more signals. By way of example, and not limitation, communication media include wired media, such as a wired network or direct-wired connection, and wireless media such as acoustic, RF, infrared and other wireless media.

With reference again to FIG. 14, the example environment 1400 for implementing various embodiments of the aspects described herein includes a computer 1402, the computer 1402 including a processing unit 1404, a system memory 1406 and a system bus 1408. The system bus 1408 couples system components including, but not limited to, the system memory 1406 to the processing unit 1404. The processing unit 1404 can be any of various commercially available processors. Dual microprocessors and other multi-processor architectures can also be employed as the processing unit 1404.

The system bus 1408 can be any of several types of bus structure that can further interconnect to a memory bus (with or without a memory controller), a peripheral bus, and a local bus using any of a variety of commercially available bus architectures. The system memory 1406 includes ROM 1410 and RAM 1412. A basic input/output system (BIOS) can be stored in a non-volatile memory such as ROM, erasable programmable read only memory (EPROM), EEPROM, which BIOS contains the basic routines that help to transfer information between elements within the computer 1402, such as during startup. The RAM 1412 can also include a high-speed RAM such as static RAM for caching data.

The computer 1402 further includes an internal hard disk drive (HDD) 1414 (e.g., EIDE, SATA), and can include one or more external storage devices 1416 (e.g., a magnetic floppy disk drive (FDD) 1416, a memory stick or flash drive reader, a memory card reader, etc.). While the internal HDD 1414 is illustrated as located within the computer 1402, the internal HDD 1414 can also be configured for external use in a suitable chassis (not shown). Additionally, while not shown in environment 1400, a solid state drive (SSD) could be used in addition to, or in place of, an HDD 1414.

Other internal or external storage can include at least one other storage device 1420 with storage media 1422 (e.g., a solid state storage device, a nonvolatile memory device, and/or an optical disk drive that can read or write from removable media such as a CD-ROM disc, a DVD, a BD, etc.). The external storage 1416 can be facilitated by a network virtual machine. The HDD 1414, external storage device(s) 1416 and storage device (e.g., drive) 1420 can be connected to the system bus 1408 by an HDD interface 1424, an external storage interface 1426 and a drive interface 1428, respectively.

The drives and their associated computer-readable storage media provide nonvolatile storage of data, data structures, computer-executable instructions, and so forth. For the computer 1402, the drives and storage media accommodate the storage of any data in a suitable digital format. Although the description of computer-readable storage media above refers to respective types of storage devices, it should be appreciated by those skilled in the art that other types of storage media which are readable by a computer, whether presently existing or developed in the future, could also be used in the example operating environment, and further, that any such storage media can contain computer-executable instructions for performing the methods described herein.

A number of program modules can be stored in the drives and RAM 1412, including an operating system 1430, one or more application programs 1432, other program modules 1434 and program data 1436. All or portions of the operating system, applications, modules, and/or data can also be cached in the RAM 1412. The systems and methods described herein can be implemented utilizing various commercially available operating systems or combinations of operating systems.

Computer 1402 can optionally comprise emulation technologies. For example, a hypervisor (not shown) or other intermediary can emulate a hardware environment for operating system 1430, and the emulated hardware can optionally be different from the hardware illustrated in FIG. 14. In such an embodiment, operating system 1430 can comprise one virtual machine (VM) of multiple VMs hosted at computer 1402. Furthermore, operating system 1430 can provide runtime environments, such as the Java runtime environment or the .NET framework, for applications 1432. Runtime environments are consistent execution environments that allow applications 1432 to run on any operating system that includes the runtime environment. Similarly, operating system 1430 can support containers, and applications 1432 can be in the form of containers, which are lightweight, standalone, executable packages of software that include, e.g., code, runtime, system tools, system libraries and settings for an application.

Further, computer 1402 can be enabled with a security module, such as a trusted processing module (TPM). For instance with a TPM, boot components hash next in time boot components, and wait for a match of results to secured values, before loading a next boot component. This process can take place at any layer in the code execution stack of computer 1402, e.g., applied at the application execution level or at the operating system (OS) kernel level, thereby enabling security at any level of code execution.

A user can enter commands and information into the computer 1402 through one or more wired/wireless input devices, e.g., a keyboard 1438, a touch screen 1440, and a pointing device, such as a mouse 1442. Other input devices (not shown) can include a microphone, an infrared (IR) remote control, a radio frequency (RF) remote control, or other remote control, a joystick, a virtual reality controller and/or virtual reality headset, a game pad, a stylus pen, an image input device, e.g., camera(s), a gesture sensor input device, a vision movement sensor input device, an emotion or facial detection device, a biometric input device, e.g., fingerprint or iris scanner, or the like. These and other input devices are often connected to the processing unit 1404 through an input device interface 1444 that can be coupled to the system bus 1408, but can be connected by other interfaces, such as a parallel port, an IEEE 1394 serial port, a game port, a USB port, an IR interface, a BLUETOOTH® interface, etc.

A monitor 1446 or other type of display device can be also connected to the system bus 1408 via an interface, such as a video adapter 1448. In addition to the monitor 1446, a computer typically includes other peripheral output devices (not shown), such as speakers, printers, etc.

The computer 1402 can operate in a networked environment using logical connections via wired and/or wireless communications to one or more remote computers, such as a remote computer(s) 1450. The remote computer(s) 1450 can be a workstation, a server computer, a router, a personal computer, portable computer, microprocessor-based entertainment appliance, a peer device or other common network node, and typically includes many or all of the elements described relative to the computer 1402, although, for purposes of brevity, only a memory/storage device 1452 is illustrated. The logical connections depicted include wired/wireless connectivity to a local area network (LAN) 1454 and/or larger networks, e.g., a wide area network (WAN) 1456. Such LAN and WAN networking environments are commonplace in offices and companies, and facilitate enterprise-wide computer networks, such as intranets, all of which can connect to a global communications network, e.g., the Internet.

When used in a LAN networking environment, the computer 1402 can be connected to the local network 1454 through a wired and/or wireless communication network interface or adapter 1458. The adapter 1458 can facilitate wired or wireless communication to the LAN 1454, which can also include a wireless access point (AP) disposed thereon for communicating with the adapter 1458 in a wireless mode.

When used in a WAN networking environment, the computer 1402 can include a modem 1460 or can be connected to a communications server on the WAN 1456 via other means for establishing communications over the WAN 1456, such as by way of the Internet. The modem 1460, which can be internal or external and a wired or wireless device, can be connected to the system bus 1408 via the input device interface 1444. In a networked environment, program modules depicted relative to the computer 1402 or portions thereof, can be stored in the remote memory/storage device 1452. It will be appreciated that the network connections shown are example and other means of establishing a communications link between the computers can be used.

When used in either a LAN or WAN networking environment, the computer 1402 can access cloud storage systems or other network-based storage systems in addition to, or in place of, external storage devices 1416 as described above. Generally, a connection between the computer 1402 and a cloud storage system can be established over a LAN 1454 or WAN 1456 e.g., by the adapter 1458 or modem 1460, respectively. Upon connecting the computer 1402 to an associated cloud storage system, the external storage interface 1426 can, with the aid of the adapter 1458 and/or modem 1460, manage storage provided by the cloud storage system as it would other types of external storage. For instance, the external storage interface 1426 can be configured to provide access to cloud storage sources as if those sources were physically connected to the computer 1402.

The computer 1402 can be operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, store shelf, etc.), and telephone. This can include Wireless Fidelity (Wi-Fi) and BLUETOOTH® wireless technologies. Thus, the communication can be a predefined structure as with a conventional network or simply an ad hoc communication between at least two devices.

The above description of illustrated embodiments of the subject disclosure, comprising what is described in the Abstract, is not intended to be exhaustive or to limit the disclosed embodiments to the precise forms disclosed. While specific embodiments and examples are described herein for illustrative purposes, various modifications are possible that are considered within the scope of such embodiments and examples, as those skilled in the relevant art can recognize.

In this regard, while the disclosed subject matter has been described in connection with various embodiments and corresponding Figures, where applicable, it is to be understood that other similar embodiments can be used or modifications and additions can be made to the described embodiments for performing the same, similar, alternative, or substitute function of the disclosed subject matter without deviating therefrom. Therefore, the disclosed subject matter should not be limited to any single embodiment described herein, but rather should be construed in breadth and scope in accordance with the appended claims below.

As it employed in the subject specification, the term "processor" can refer to substantially any computing processing unit or device comprising, but not limited to comprising, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit, a digital signal processor, a field programmable gate array, a programmable logic controller, a complex programmable logic device, a discrete gate or transistor logic, discrete hardware components, or any combination thereof designed to perform the functions described herein. Processors can exploit nano-scale architectures such as, but not limited to, molecular and quantum-dot based transistors, switches and gates, in order to optimize space usage or enhance performance of user equipment. A processor may also be implemented as a combination of computing processing units.

As used in this application, the terms "component," "system," "platform," "layer," "selector," "interface," and the like are intended to refer to a computer-related entity or an entity related to an operational apparatus with one or more specific functionalities, wherein the entity can be either hardware, a combination of hardware and software, software, or software in execution. As an example, a component may be, but is not limited to being, a process running on a processor, a processor, an object, an executable, a thread of execution, a program, and/or a computer. By way of illustration and not limitation, both an application running on a server and the server can be a component. One or more components may reside within a process and/or thread of execution and a component may be localized on one computer and/or distributed between two or more computers. In addition, these components can execute from various computer readable media having various data structures stored thereon. The components may communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry, which is operated by a software or a firmware application executed by a processor, wherein the processor can be internal or external to the apparatus and executes at least a part of the software or firmware application. As yet another example, a component can be an apparatus that provides specific functionality through electronic components without mechanical parts, the electronic components can comprise a processor therein to execute software or firmware that confers at least in part the functionality of the electronic components.

In addition, the term "or" is intended to mean an inclusive "or" rather than an exclusive "or." That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances.

While the embodiments are susceptible to various modifications and alternative constructions, certain illustrated implementations thereof are shown in the drawings and have been described above in detail. It should be understood, however, that there is no intention to limit the various embodiments to the specific forms disclosed, but on the contrary, the intention is to cover all modifications, alternative constructions, and equivalents falling within the spirit and scope.

In addition to the various implementations described herein, it is to be understood that other similar implementations can be used or modifications and additions can be made to the described implementation(s) for performing the same or equivalent function of the corresponding implementation(s) without deviating therefrom. Still further, multiple processing chips or multiple devices can share the performance of one or more functions described herein, and similarly, storage can be effected across a plurality of devices. Accordingly, the various embodiments are not to be limited to any single implementation, but rather are to be construed in breadth, spirit and scope in accordance with the appended claims.

What is claimed is:

1. A system, comprising:
   a processor; and
   a memory that stores executable instructions that, when executed by the processor, facilitate performance of operations, the operations comprising:
   receiving a request to initiate a multipart upload event, the request comprising a routing key;
   in response to the receiving the request, determining a segment of a data stream, and creating a micro-transaction data structure associated with the segment;
   receiving, in respective uploads, respective event subparts of the multipart upload event, wherein the respective event subparts comprise respective information that associates the respective event subparts with the multipart upload event and respective sequence numbers that indicate respective position order relative to respective other event subparts of the multipart upload event, wherein the respective event subparts are appended in order based on the respective sequence numbers;
   maintaining the respective event subparts in the micro-transaction data structure;
   receiving a communication indicating that the multipart upload event is complete;
   in response to the receiving the communication, merging the micro-transaction data structure into the segment;
   serving first event data from the segment;
   encountering a multipart event reference that identifies the micro-transaction data structure;
   determining whether the multipart upload event is in progress;
   in response to determining that the multipart upload event is in progress, blocking reading until an unblocked state is determined;
   in response to determining the unblocked state, determining whether the micro-transaction data structure identified in the multipart event reference exists; and
   in response to determining that the micro-transaction data structure identified in the multipart event reference exists, serving second event data from the micro-transaction data structure.

2. The system of claim 1, wherein the micro-transaction data structure is maintained in a segment store that maintains the segment.

3. The system of claim 2, wherein the operations further comprise determining that a total number of active micro-transactions associated with the segment store has not reached a defined upper limit.

4. The system of claim 2, wherein the operations further comprise associating an identifier with the micro-transaction data structure that is a unique identifier within the segment store.

5. The system of claim 1, wherein the micro-transaction data structure comprises a group of micro-transaction segments, and wherein the maintaining the respective event subparts in the micro-transaction data structure comprises distributing the respective event subparts among the group of micro-transaction segments.

6. The system of claim 1, wherein the multipart upload event is associated with an order-on-start order choice indicator that blocks readers from reading beyond an event reference to the micro-transaction data structure in the segment until the multipart upload event completes.

7. The system of claim 6, wherein the event reference is appended to the segment in a composite append operation with an attribute of the segment that indicates the multipart upload event is in progress, and wherein, upon merging the micro-transaction data structure into the segment, the attribute is changed to complete or the attribute is removed.

8. The system of claim 1, wherein the multipart upload event is associated with an order-on-end order choice indicator, and wherein the merging the micro-transaction data structure into the segment comprises appending an event reference to the micro-transaction data structure in the segment.

9. The system of claim 1, wherein the micro-transaction data structure is maintained in a segment store that maintains the segment, wherein the segment store comprises a component of a data streaming storage platform, wherein the request to initiate the multipart upload event is received by a client component of the data streaming storage platform coupled to a writer application that uploads the respective event subparts to the client component.

10. The system of claim 9, wherein the client component determines the segment via communication with a controller of the data streaming storage platform coupled to the client component, wherein the client component communicates with the segment store that maintains the segment, and wherein the segment store creates the micro-transaction data structure associated with the segment.

11. The system of claim 1, wherein the respective event subparts are associated with respective sequence numbers, and wherein the operations further comprise:
determining that the multipart upload event is not in progress,
determining that the micro-transaction data structure identified in the multipart event reference exists,
reading the respective event subparts from the micro-transaction data structure,
obtaining the respective sequence numbers of the respective event subparts, and
serving third event data from the micro-transaction data structure in sequence number order based on the respective sequence numbers of the respective event subparts.

12. The system of claim 1, wherein the serving the second event data from the micro-transaction data structure in sequence number order based on the respective sequence numbers of the respective event subparts comprises accessing metadata that maps the respective sequence numbers to offset locations of the respective event subparts in the micro-transaction data structure.

13. The system of claim 1, wherein the multipart upload event is a first multipart upload event, wherein the micro-transaction data structure is a first micro-transaction data structure, wherein the segment is a first segment, wherein the request is a first request, wherein the respective event subparts are first respective event subparts, wherein the respective information is first respective information, wherein the respective sequence numbers that indicate respective position order relative to other event subparts of the first multipart upload event are first respective sequence numbers that indicate first respective position order relative to first respective other event subparts of the first multipart upload event, and wherein the operations further comprise:
receiving a second request to initiate a second multipart upload event, the second request comprising a second routing key,
in response to the receiving the second request,
determining a second segment of the data stream, and
creating a second micro-transaction data structure associated with the second segment,
receiving, in respective uploads, second respective event subparts of the second multipart upload event, wherein the second respective event subparts comprise second respective information that associates the second respective event subparts with the second multipart upload event and second respective sequence numbers that indicate second respective position order relative to second respective other event subparts of the second multipart upload event,
maintaining the second respective event subparts in the second micro-transaction data structure, and
in response to receiving a communication that the second multipart upload event is abandoned, or in response to the determining that the multipart upload event is expired before completion as a result of inactivity, deleting the second micro-transaction data structure.

14. A method, comprising:
maintaining, by a streaming data storage system comprising a processor, a segment of a data stream of events, the segment corresponding to a routing key associated with events appended to the segment;
receiving, by the streaming data storage system, a multipart upload event comprising multipart upload event subparts;
maintaining, by the streaming data storage system, a multi-transaction data structure containing the multipart upload event subparts of the multipart upload event;
appending, to the segment by the streaming data storage system, a multipart upload event reference, the multipart upload event reference identifying the multi-transaction data structure;
in response to a read request, serving, by the streaming data storage system, event data from the segment;
in response to the read request, encountering, by the streaming data storage system, the multipart upload event reference; and
in response to the encountering the multipart upload event reference, serving event data of the multipart upload event, comprising obtaining the event data from the multipart upload event subparts of the multi-transaction data structure identified in the multi-transaction data structure,
wherein each multipart upload event subparts of the multipart upload event subparts is associated with a sequence number that represents a position order in the multipart upload event relative to respective positions of respective other ones of the multipart upload event subparts, and
wherein the maintaining the multi-transaction segment comprises maintaining the multipart upload event subparts in sequential order, according to sequence number, in the multi-transaction segment.

15. The method of claim 14, wherein the appending, to the segment, the multipart upload event reference comprises appending the multipart upload event reference after the multipart upload event has been determined to be complete.

16. The method of claim 14, wherein the appending, to the segment, the multipart upload event reference comprises appending the multipart upload event reference after the multipart upload event has been determined to have started, and further comprising, setting, by the streaming data storage system, an attribute associated with the segment to indicate that the multipart upload event is in progress, blocking, by the streaming data storage system, reading from the segment beyond the multipart upload event reference while the attribute indicates that the multipart upload event is in progress, and clearing, by the streaming data storage system, the attribute after the multipart upload event has been determined to be complete to unblock reading from the segment.

17. The method of claim 14, wherein the multipart upload event subparts are associated with respective sequence numbers that represent respective relative position orders of the respective multipart upload event subparts in the multipart upload event, wherein the maintaining the multi-transaction segment comprises maintaining the respective sequence numbers with the respective multipart upload event subparts, and wherein the serving the event data of the multipart upload event comprises reading the respective multipart upload event subparts and the respective sequence numbers, and serving the event data from the respective multipart upload event subparts in sequential order based on the respective sequence numbers.

18. A non-transitory machine-readable medium, comprising executable instructions that, when executed by a processor of a streaming data storage system, facilitate performance of operations, the operations comprising:
maintaining a multipart upload event in association with a data segment of a data stream, the data segment based on a routing key associated with the multipart upload event, the maintaining comprising creating a micro-transaction data structure, associating the micro-transaction data structure with the data segment, storing event subparts of the multipart upload event in the micro-transaction data structure, in which respective event subparts of the event subparts are associated with respective sequence numbers, and appending a reference to the micro-transaction data structure in the data segment, wherein the respective event subparts are appended in order based on the respective sequence numbers;
serving first event data from the data segment;
encountering a multipart event reference that identifies the micro-transaction data structure;
determining whether the multipart upload event is in progress;
in response to determining that the multipart upload event is in progress, blocking reading until an unblocked state is determined;
in response to determining the unblocked state, determining whether the micro-transaction data structure identified in the multipart event reference exists; and
in response to determining that the micro-transaction data structure identified in the multipart event reference exists, serving second event data from the micro-transaction data structure.

19. The non-transitory machine-readable medium of claim 18, wherein the event subparts of the multipart upload event stored in the micro-transaction data structure are not stored in sequential order, and wherein the serving the multipart upload event data comprises obtaining the respective sequence numbers of the respective event subparts, and returning third event data from the respective event subparts in sequential order based on the respective sequence numbers.

20. The non-transitory machine-readable medium of claim 18, wherein the micro-transaction data structure is maintained in a segment store that maintains the data segment.

* * * * *